US011102727B2

United States Patent
Xu et al.

(10) Patent No.: US 11,102,727 B2
(45) Date of Patent: Aug. 24, 2021

(54) UPLINK CONTROL METHOD, APPARATUS, AND SYSTEM

(71) Applicant: Huawei Technologies Co., Ltd., Shenzhen (CN)

(72) Inventors: Kai Xu, Shanghai (CN); Liwen Zhang, Shanghai (CN); Lin Zhou, Shanghai (CN); Bo Cheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/881,867

(22) Filed: May 22, 2020

(65) Prior Publication Data

US 2020/0322894 A1 Oct. 8, 2020

Related U.S. Application Data

(63) Continuation of application No. PCT/CN2018/117015, filed on Nov. 22, 2018.

(30) Foreign Application Priority Data

Nov. 24, 2017 (CN) .......................... 201711194883.4

(51) Int. Cl.
*H04W 52/36* (2009.01)
*H04W 52/14* (2009.01)
*H04W 52/24* (2009.01)

(52) U.S. Cl.
CPC ....... *H04W 52/146* (2013.01); *H04W 52/242* (2013.01); *H04W 52/245* (2013.01)

(58) Field of Classification Search
CPC ............. H04W 52/146; H04W 52/245; H04W 52/242

USPC .................................................... 455/522, 69
See application file for complete search history.

(56) References Cited

U.S. PATENT DOCUMENTS

| 6,952,181 | B2 * | 10/2005 | Karr | ...................... G01C 21/206 342/457 |
| 8,428,521 | B2 * | 4/2013 | Luo | ........................ H04W 52/42 455/69 |

(Continued)

FOREIGN PATENT DOCUMENTS

| CN | 101212795 A | 7/2008 |
| CN | 101932088 A | 12/2010 |

(Continued)

OTHER PUBLICATIONS

Huawei et al., "Discussion on the UL power control for LTE-NR uplink coexistence," 3GPP TSG RAN WG1 Meeting AH NR#3, R1-1715479, Nagoya, Japan, Sep. 18-21, 2017, 5 pages.

(Continued)

*Primary Examiner* — Hai V Nguyen
(74) *Attorney, Agent, or Firm* — Slater Matsil, LLP

(57) ABSTRACT

An uplink control method, includes: determining a downlink path loss based on a first reference signal receive power that is of a serving cell in which the terminal device is located and that is obtained through measurement; receiving a first transmit power and a second transmit power that are sent by the base station; and if the first reference signal receive power is greater than or equal to a preset threshold, obtaining, by the terminal, an uplink transmit power of the terminal in a first network; or if the first reference signal receive power is less than a preset threshold, obtaining, by the terminal, an uplink transmit power of the terminal in the first network.

13 Claims, 16 Drawing Sheets

(56) References Cited

U.S. PATENT DOCUMENTS

| | | | | |
|---|---|---|---|---|
| 8,792,924 | B2* | 7/2014 | Xiao | H04B 7/024 |
| | | | | 455/515 |
| 8,811,249 | B2* | 8/2014 | Seo | H04W 52/281 |
| | | | | 370/311 |
| 8,897,829 | B2* | 11/2014 | Buckley | H04W 52/245 |
| | | | | 455/522 |
| 9,144,040 | B2* | 9/2015 | Xiao | H04W 52/346 |
| 9,451,639 | B2* | 9/2016 | Li | H04W 74/006 |
| 9,648,569 | B2* | 5/2017 | Madan | H04W 52/146 |
| 9,860,852 | B2* | 1/2018 | Madan | H04B 17/309 |
| 10,264,437 | B2* | 4/2019 | Poitau | H04W 72/0446 |
| 10,278,185 | B2* | 4/2019 | Wang | H04W 52/146 |
| 10,477,577 | B2* | 11/2019 | Jeon | H04W 52/325 |
| 10,530,622 | B2* | 1/2020 | Zarifi | H04L 5/0048 |
| 10,568,050 | B2* | 2/2020 | Jeon | H04W 52/50 |
| 10,659,274 | B2* | 5/2020 | Jung | H04W 52/143 |
| 10,680,855 | B2* | 6/2020 | Baligh | H04L 5/0041 |
| 10,694,409 | B2* | 6/2020 | Ryu | H04W 76/27 |
| 10,727,889 | B2* | 7/2020 | Ban | H04B 1/3838 |
| 10,778,387 | B2* | 9/2020 | Maaref | H04W 72/048 |
| 10,798,684 | B2* | 10/2020 | Marinier | H04W 52/146 |
| 10,834,686 | B2* | 11/2020 | Xiao | H01Q 1/246 |
| 10,856,236 | B1* | 12/2020 | Manolakos | H04W 64/00 |
| 10,880,719 | B2* | 12/2020 | Poitau | H04W 8/005 |
| 2006/0025158 | A1* | 2/2006 | Leblanc | G01S 5/0205 |
| | | | | 455/456.2 |
| 2011/0207415 | A1* | 8/2011 | Luo | H04W 52/42 |
| | | | | 455/68 |
| 2011/0280169 | A1* | 11/2011 | Seo | H04W 72/0406 |
| | | | | 370/311 |
| 2014/0220905 | A1* | 8/2014 | Buckley | H04W 52/245 |
| | | | | 455/69 |
| 2014/0226578 | A1* | 8/2014 | Zhu | H04W 52/40 |
| | | | | 370/329 |
| 2014/0321406 | A1* | 10/2014 | Marinier | H04B 7/024 |
| | | | | 370/329 |
| 2015/0016312 | A1* | 1/2015 | Li | H04L 5/14 |
| | | | | 370/280 |
| 2015/0358960 | A1* | 12/2015 | Zhang | H04W 72/0426 |
| | | | | 455/450 |
| 2016/0142898 | A1* | 5/2016 | Poitau | H04W 76/14 |
| | | | | 370/329 |
| 2016/0174231 | A1* | 6/2016 | Wang | H04W 52/28 |
| | | | | 370/329 |
| 2016/0337988 | A1* | 11/2016 | Nan | H04W 52/362 |
| 2017/0331645 | A1* | 11/2017 | Baligh | H04L 5/0051 |
| 2018/0027437 | A1* | 1/2018 | Vitthaladevuni | H04W 52/343 |
| | | | | 370/252 |
| 2018/0145805 | A1* | 5/2018 | Maaref | H04L 5/0092 |
| 2018/0324708 | A1* | 11/2018 | Cheng | H04W 52/367 |
| 2018/0324716 | A1* | 11/2018 | Jeon | H04W 74/0833 |
| 2018/0324853 | A1* | 11/2018 | Jeon | H04W 74/006 |
| 2019/0053080 | A1* | 2/2019 | Ryu | H04W 72/0413 |
| 2019/0074882 | A1* | 3/2019 | Zhou | H04W 72/046 |
| 2019/0104549 | A1* | 4/2019 | Deng | H04B 7/0617 |
| 2019/0191290 | A1* | 6/2019 | Poitau | H04W 72/0446 |
| 2019/0320394 | A1* | 10/2019 | Sun | H04W 72/0453 |
| 2020/0022099 | A1* | 1/2020 | Liu | H04W 72/0446 |
| 2020/0068514 | A1* | 2/2020 | Liu | H04L 5/00 |
| 2020/0092151 | A1* | 3/2020 | Zarifi | H04J 13/0062 |
| 2020/0120612 | A1* | 4/2020 | Sun | H04W 52/36 |
| 2020/0137646 | A1* | 4/2020 | Shi | H04W 24/10 |
| 2020/0146057 | A1* | 5/2020 | Jeon | H04W 52/325 |
| 2020/0163026 | A1* | 5/2020 | Zhao | H04W 52/243 |
| 2020/0178185 | A1* | 6/2020 | Jeons | H04W 52/367 |
| 2020/0280868 | A1* | 9/2020 | Ryu | H04L 5/0053 |
| 2020/0304344 | A1* | 9/2020 | Baligh | H04L 27/2613 |
| 2020/0367196 | A1* | 11/2020 | Chen | H04W 24/10 |
| 2020/0374806 | A1* | 11/2020 | Manolakos | G01S 5/0226 |

FOREIGN PATENT DOCUMENTS

| | | |
|---|---|---|
| CN | 102740434 A | 10/2012 |
| CN | 103945504 A | 7/2014 |
| CN | 103974397 A | 8/2014 |
| CN | 106488543 A | 3/2017 |
| WO | 2013067030 A1 | 5/2013 |

OTHER PUBLICATIONS

Huawei et al., "UL power control for SUL and LTE-NR uplink coexistence with UL sharing," 3GPP TSG RAN WG1 Meeting #90, R1-1712164, Prague, Czech Republic, Aug. 21-25, 2017, 5 pages.

Huawei et al., "Overview of NR UL for LTE-NR coexistence," 3GPP TSG RAN WG1 Meeting #89, R1-1709383, Hangzhou, China, May 15-19, 2017, 15 pages.

Huawei et al., "Considerations of NR UL operation for LTE-NR coexistence", 3GPP TSG RAN WG1 Meeting #88bis R1-1704199, Spokane, WA, USA, Apr. 3-7, 2017, 8 pages.

* cited by examiner

UPLINK CONTROL METHOD, APPARATUS, AND SYSTEM

CROSS-REFERENCE TO RELATED APPLICATIONS

This application is a continuation of International Application No. PCT/CN2018/117015, filed on Nov. 22, 2018, which claims priority to Chinese Patent Application No. 201711194883.4, filed on Nov. 24, 2017. The disclosures of the aforementioned applications are hereby incorporated by reference in their entireties.

TECHNICAL FIELD

Embodiments of this application relate to communications engineering technologies, and in particular, to an uplink control method, apparatus, and system.

BACKGROUND

A high frequency carrier is introduced in a new radio (NR) technology. Therefore, during NR deployment, because of factors such as a high frequency and an uplink-downlink configuration, NR uplink coverage and downlink coverage differ greatly. In this case, if a low frequency carrier is used for uplink transmission and a high frequency carrier is used for downlink transmission, the difference between the NR uplink coverage and downlink coverage can be reduced. This technology is referred to as uplink and downlink decoupling.

In a Long Term Evolution (LTE) technology, because frequencies of an uplink carrier and a downlink carrier are the same or similar, after a downlink path loss is obtained through downlink measurement, the downlink path loss may be used as an uplink path loss, and uplink transmit power of a terminal is obtained based on the uplink path loss. If a low frequency resource is obtained in NR by sharing with another network, for example, the low frequency resource may be obtained through LTE-NR uplink sharing, to form a supplementary uplink (SUL) cell, because there is no corresponding intra-frequency downlink cell, in an NR uplink and downlink decoupling scenario, user equipment (UE) cannot implement uplink power control by means of downlink measurement. To be specific, in an NR uplink and downlink decoupling scenario, a frequency difference between a carrier used for downlink transmission and a carrier used for uplink transmission is very large (for example, a downlink frequency is 3.5 GHz, and an uplink frequency is 1.8 GHz). The uplink and downlink path losses differ greatly. Therefore, the downlink path loss cannot be used as the uplink path loss to obtain the uplink transmit power of the terminal.

Currently, an uplink control method is urgently required to obtain uplink transmit power of a terminal in an uplink and downlink decoupling scenario.

SUMMARY

This application provides an uplink control method, an apparatus, and a system, to obtain uplink transmit power of a terminal in an uplink and downlink decoupling scenario.

According to a first aspect, an embodiment of this application provides an uplink control method, including: measuring, by a terminal based on a received first reference signal, a first reference signal receive power of a serving cell in which the terminal is located, and determining a downlink path loss based on the first reference signal receive power and a received first reference signal transmit power, where the first reference signal is sent by a first target base station of a first network to the terminal by using an air interface resource of the first network; receiving, by the terminal, a first transmit power and a second transmit power that are sent by the first target base station, where the first transmit power includes: an uplink transmit power of the terminal expected by the first target base station and a path loss offset, and the second transmit power includes: the uplink transmit power of the terminal expected by the first target base station, the path loss offset, and a penetration loss offset; and if the first reference signal receive power is greater than or equal to a preset threshold, obtaining, by the terminal, an uplink transmit power of the terminal in the first network based on the downlink path loss, the first transmit power, and a maximum transmit power of the terminal; or if the first reference signal receive power is less than a preset threshold, obtaining, by the terminal, an uplink transmit power of the terminal in the first network based on the downlink path loss, the second transmit power, and a maximum transmit power of the terminal.

According to the foregoing method, the uplink transmit power of the terminal is obtained in the uplink and downlink decoupling scenario. Because a difference between an uplink path loss and a downlink path loss, and whether the terminal is located indoors or outdoors are considered, the obtained uplink transmit power of the terminal is relatively accurate.

In a possible design, an uplink access cell may be determined by using at least the following three feasible implementations.

In a first feasible implementation, the terminal measures a second reference signal receive power of at least one cell in which the terminal is located, where the second reference signal is sent by a first base station of the first network to the terminal by using an air interface resource of a second network, and a frequency band to which a carrier corresponding to the air interface resource of the second network belongs is the same as a frequency band to which a carrier used by the terminal to perform uplink transmission in the first network belongs; and the terminal selects, from the at least one cell, a target cell having a maximum second reference signal receive power, where an identifier of the target cell is used by the terminal to initially access the first network.

In a second feasible implementation, the terminal receives an identifier of a virtual hyper cell sent by the first target base station, where the identifier of the virtual hyper cell is used by the terminal to initially access the first network, where the virtual hyper cell is obtained by combining, by the first target base station by using a user centric no cell radio access UCNC technology, a plurality of neighboring cells, where the first target base station is a base station of the first network.

In a third feasible implementation, the terminal obtains, through measurement based on a received third reference signal sent by a second base station of a second network, a third reference signal receive power of at least one cell in which the terminal is located, and selects, from the at least one cell, a target cell having a maximum third reference signal receive power, where an identifier of the target cell is used by the terminal to initially access the first network, the first network and the second network adopt non-standalone networking; and a frequency band to which a carrier used by the terminal to perform uplink transmission in the first network belongs is the same as a frequency band to which a carrier corresponding to an air interface resource of the second network belongs; the terminal in a connected state and the terminal in an idle state receive different third reference signals; and the receiving, by the terminal, a first transmit power and a second transmit power that are sent by the first target base station corresponding to the serving cell includes: receiving, by the terminal, the first transmit power and the second transmit power that are sent by the first target base station corresponding to the serving cell by using a second target base station, where the second target base station is a base station of the second network.

In a possible design, if the uplink transmit power of the terminal is an initial transmit power of a random access preamble, the receiving, by the terminal, a first transmit power and a second transmit power that are sent by the first target base station includes: receiving, by the terminal, the first transmit power, the second transmit power, and a power offset of a preamble currently configured in a preamble format 0 that are sent by the first target base station; the obtaining, by the terminal, an uplink transmit power of the terminal in the first network based on the downlink path loss, the first transmit power, and a maximum transmit power of the terminal includes: obtaining, by the terminal, the initial transmit power of the random access preamble of the terminal based on the downlink path loss, a sum of the first transmit power and the power offset, and the maximum transmit power of the terminal; or the obtaining, by the terminal, an uplink transmit power of the terminal in the first network based on the downlink path loss, the second transmit power, and a maximum transmit power of the terminal includes: obtaining, by the terminal, the initial transmit power of the random access preamble of the terminal based on the downlink path loss, a sum of the second transmit power and the power offset, and the maximum transmit power of the terminal.

According to a second aspect, an embodiment of this application provides an uplink control method, including: when a first network is initially accessed, receiving, by a terminal, preamble sequences in a plurality of formats that are delivered by a base station; if the terminal is a decoupling terminal, selecting, by the terminal, a first target preamble sequence from the preamble sequences in a plurality of formats, and sending the first target preamble sequence to the base station, where a format of the first target preamble sequence is used to instruct the base station of the first network to send a random access response message by using a first baseband processing unit BBU, and a frequency band corresponding to the first BBU is different from a frequency band to which a carrier used by the terminal for uplink transmission belongs.

According to the foregoing method, the decoupling terminal is identified in an uplink and downlink decoupling scenario.

In a possible design, the method further includes: if the terminal is a non-decoupling terminal, selecting, by the terminal, a second target preamble sequence from a plurality of preamble sequences in a second format, and sending the second target preamble sequence to the base station, where a format of the second target preamble sequence is used to instruct the base station of the first network to send a random access response message by using a second BBU, and a frequency band corresponding to the second BBU is the same as the frequency band to which the carrier used by the terminal for uplink transmission belongs.

According to a third aspect, an embodiment of this application provides an uplink control method, including: sending, by a base station, a first reference signal to a terminal by using an air interface resource of a first network, where the base station is a base station of the first network, and the first reference signal is used by the terminal to measure a first reference signal receive power of a serving cell in which the terminal is located; and sending, by the base station, a first reference signal transmit power, a first transmit power, and a second transmit power to the terminal, where the first transmit power includes: an uplink transmit power of the terminal expected by the base station and a path loss offset, the second transmit power includes: the uplink transmit power of the terminal expected by the base station, the path loss offset, and a penetration loss offset, and the first reference signal receive power and the first reference signal transmit power are used by the terminal to determine a downlink path loss, where when the first reference signal receive power is greater than or equal to a preset threshold, the first transmit power and the downlink path loss are used by the terminal to obtain an uplink transmit power in the first network; or when the first reference signal receive power is less than a preset threshold, the second transmit power and the downlink path loss are used by the terminal to obtain an uplink transmit power in the first network.

In a possible design, an uplink access cell may be determined by using at least the following two feasible implementations:

A first feasible implementation is: sending, by the base station, a second reference signal to the terminal by using an air interface resource of a second network, where a frequency band to which a carrier used by the terminal to perform uplink transmission in the first network belongs is the same as a frequency band to which a carrier corresponding to the air interface resource of the second network belongs; the second reference signal is used by the terminal to measure a second reference signal receive power of a serving cell in which the terminal is located, and the first reference signal receive power is used by the terminal to determine an initial access cell.

A second feasible implementation is: combining, by the base station by using a user centric no cell radio access UCNC technology, a plurality of neighboring cells to obtain a virtual hyper cell; and sending, by the base station, an identifier of the virtual hyper cell to the terminal, where the identifier of the virtual hyper cell is used by the terminal to access the first network.

In a possible design, if the uplink transmit power of the terminal is an initial transmit power of a random access preamble, the sending, by the base station, a first reference signal transmit power, a first transmit power, and a second transmit power to the terminal includes: sending, by the base station, the first reference signal transmit power, the first transmit power, and the second transmit power to the terminal, and sending a power offset of a preamble currently configured in a preamble format 0 to the terminal, where when the first reference signal receive power is greater than or equal to the preset threshold, the first transmit power, the downlink path loss, and the power offset are used by the terminal to obtain the initial transmit power of the random access preamble in the first network; or when the first reference signal receive power is less than the preset threshold, the second transmit power, the downlink path loss, and the power offset are used by the terminal to obtain the initial transmit power of the random access preamble in the first network.

According to a fourth aspect, an embodiment of this application provides an uplink control method, including: sending, by a base station, preamble sequences in a plurality of formats to a terminal; if the terminal is a decoupling terminal, receiving, by the base station, a first target preamble sequence sent by the terminal, and obtaining a format of the first target preamble sequence, where the format of the first target preamble sequence is used to indicate that the terminal is a decoupling terminal, and the first target preamble sequence is selected by the terminal from the preamble sequences in a plurality of formats; and sending, by the base station, a random access response message to the terminal by using a first baseband processing unit BBU, where a frequency band corresponding to the first BBU is different from a frequency band to which a carrier used by the terminal for uplink transmission belongs.

In a possible design, the method further includes: if the terminal is a non-decoupling terminal, receiving, by the base station, a second target preamble sequence sent by the terminal, and obtaining a format of the second target preamble sequence, where the format of the second target preamble sequence is used to indicate that the terminal is a non-decoupling terminal, and the second target preamble sequence is selected by the terminal from preamble sequences in a plurality of formats; and sending, by the base station, a random access response message to the terminal by using a second BBU, where a frequency band corresponding to the second BBU is the same as the frequency band to which the carrier used by the terminal for uplink transmission belongs.

According to a fifth aspect, an embodiment of this application provides an uplink control apparatus, including: a determining module, configured to: measure, based on a received first reference signal, a first reference signal receive power of a serving cell in which a terminal is located, and determine a downlink path loss based on the first reference signal receive power and a received first reference signal transmit power, where the first reference signal is sent by a first target base station of a first network to the terminal by using an air interface resource of the first network; a receiving module, configured to receive a first transmit power and a second transmit power that are sent by the first target base station, where the first transmit power includes: an uplink transmit power of the terminal expected by the first target base station and a path loss offset, and the second transmit power includes: the uplink transmit power of the terminal expected by the first target base station, the path loss offset, and a penetration loss offset; and a transmit power obtaining module, configured to: if the first reference signal receive power is greater than or equal to a preset threshold, obtain, by the terminal, an uplink transmit power of the terminal in the first network based on the downlink path loss, the first transmit power, and a maximum transmit power of the terminal; or if the first reference signal receive power is less than a preset threshold, obtain, by the terminal, an uplink transmit power of the terminal in the first network based on the downlink path loss, the second transmit power, and a maximum transmit power of the terminal.

In a possible design, the apparatus further includes: a cell selection module, configured to: before obtaining the uplink transmit power of the terminal, measure a second reference signal receive power of at least one cell in which the terminal is located, where the second reference signal is sent by a first base station of the first network to the terminal by using an air interface resource of a second network, and a frequency band to which a carrier corresponding to the air interface resource of the second network belongs is the same as a frequency band to which a carrier used by the terminal to perform uplink transmission in the first network belongs; and selecting, from the at least one cell, a target cell having a maximum second reference signal receive power, where an identifier of the target cell is used by the terminal to initially access the first network.

In a possible design, the apparatus further includes: a cell selection module, configured to: before obtaining the uplink transmit power of the terminal, receive an identifier of a virtual hyper cell sent by the first target base station, where the identifier of the virtual hyper cell is used by the terminal to initially access the first network, where the virtual hyper cell is obtained by combining, by the first target base station by using a user centric no cell radio access UCNC technology, a plurality of neighboring cells, where the first target base station is a base station of the first network.

In a possible design, the apparatus further includes: a cell selection module, configured to: before obtaining the uplink transmit power of the terminal, obtain, through measurement based on a received third reference signal sent by a second base station of a second network, a third reference signal receive power of at least one cell in which the terminal is located, and select, from the at least one cell, a target cell having a maximum third reference signal receive power, where an identifier of the target cell is used by the terminal to initially access the first network, the first network and the second network adopt non-standalone networking, and a frequency band to which a carrier used by the terminal to perform uplink transmission in the first network belongs is the same as a frequency band to which a carrier corresponding to an air interface resource of the second network belongs; the terminal in a connected state and the terminal in an idle state receive different third reference signals; and the receiving module is specifically configured to receive the first transmit power and the second transmit power that are sent by the first target base station corresponding to the serving cell by using a second target base station, where the second target base station is a base station of the second network.

In a possible design, if the uplink transmit power of the terminal is an initial transmit power of a random access preamble, the receiving module is specifically configured to receive the first transmit power, the second transmit power, and a power offset of a preamble currently configured in a preamble format 0 that are sent by the first target base station; and the transmit power obtaining module is specifically configured to obtain the initial transmit power of the random access preamble of the terminal based on the downlink path loss, a sum of the first transmit power and the power offset, and the maximum transmit power of the terminal; or obtain the initial transmit power of the random access preamble of the terminal based on the downlink path loss, a sum of the second transmit power and the power offset, and the maximum transmit power of the terminal.

According to a sixth aspect, an embodiment of this application provides an uplink control apparatus, including: a receiving module, configured to: when a first network is initially accessed, receive preamble sequences in a plurality of formats that are delivered by a base station; a selection module, configured to: when a terminal is a decoupling terminal, select a first target preamble sequence from the preamble sequences in a plurality of formats, and send the first target preamble sequence to the base station, where a format of the first target preamble sequence is used to instruct the base station of the first network to send a random access response message by using a first baseband processing unit BBU, and a frequency band corresponding to the first BBU is different from a frequency band to which a carrier used by the terminal for uplink transmission belongs.

In a possible design, the selection module is further configured to: when the terminal is a non-decoupling terminal, select a second target preamble sequence from a plurality of preamble sequences in a second format, and send the second target preamble sequence to the base station, where a format of the second target preamble sequence is used to instruct the base station of the first network to send a random access response message by using a second BBU, and a frequency band corresponding to the second BBU is the same as the frequency band to which the carrier used by the terminal for uplink transmission belongs.

According to a seventh aspect, an embodiment of this application provides an uplink control apparatus, including: a sending module, configured to send a first reference signal to a terminal by using an air interface resource of a first network, where a base station is a base station of the first network, and the first reference signal is used by the terminal to measure a first reference signal receive power of a serving cell in which the terminal is located; and the sending module is further configured to send a first reference signal transmit power, a first transmit power, and a second transmit power to the terminal, where the first transmit power includes: an uplink transmit power of the terminal expected by the base station and a path loss offset, the second transmit power includes: the uplink transmit power of the terminal expected by the base station, the path loss offset, and a penetration loss offset, and the first reference signal receive power and the first reference signal transmit power are used by the terminal to determine a downlink path loss, where when the first reference signal receive power is greater than or equal to a preset threshold, the first transmit power and the downlink path loss are used by the terminal to obtain an uplink transmit power in the first network; or when the first reference signal receive power is less than a preset threshold, the second transmit power and the downlink path loss are used by the terminal to obtain an uplink transmit power in the first network.

In a possible design, the sending module is further configured to send a second reference signal to the terminal by using the air interface resource of a second network, where a frequency band to which a carrier used by the terminal to perform uplink transmission in the first network belongs is the same as a frequency band to which a carrier corresponding to an air interface resource of the second network belongs, the second reference signal is used by the terminal to measure a second reference signal receive power of a serving cell in which the terminal is located, and the first reference signal receive power is used by the terminal to determine an initial access cell.

In a possible design, the apparatus further includes: a cell combination module, configured to combine, by using a user centric no cell radio access UCNC technology, a plurality of neighboring cells to obtain a virtual hyper cell; and the sending module is further configured to send, an identifier of the virtual hyper cell to the terminal, where the identifier of the virtual hyper cell is used by the terminal to access the first network.

In a possible design, if the uplink transmit power of the terminal is an initial transmit power of a random access preamble, the sending module is specifically configured to send the first reference signal transmit power, the first transmit power, and the second transmit power to the terminal, and send a power offset of a preamble currently configured in a preamble format o; and when the first reference signal receive power is greater than or equal to the preset threshold, the first transmit power, the downlink path loss, and the power offset are used by the terminal to obtain the initial transmit power of the random access preamble in the first network; or when the first reference signal receive power is less than the preset threshold, the second transmit power, the downlink path loss, and the power offset are used by the terminal to obtain the initial transmit power of the random access preamble in the first network.

According to an eighth aspect, an embodiment of this application provides an uplink control apparatus, including: a sending module, configured to send preamble sequences in a plurality of formats to a terminal; and a receiving module, configured to: when the terminal is a decoupling terminal, receive a first target preamble sequence sent by the terminal, and obtain a format of the first target preamble sequence, where the format of the first target preamble sequence is used to indicate that the terminal is a decoupling terminal, and the first target preamble sequence is selected by the terminal from the preamble sequences in a plurality of formats, where the sending module is further configured to send, a random access response message to the terminal by using a first baseband processing unit BBU, where a frequency band corresponding to the first BBU is different from a frequency band to which a carrier used by the terminal for uplink transmission belongs.

In a possible design, the method further includes: the receiving module is further configured to: if the terminal is a decoupling terminal, receive a second target preamble sequence sent by the terminal, and obtain a format of the second target preamble sequence, where the format of the second target preamble sequence is used to indicate that the terminal is a non-decoupling terminal, and the second target preamble sequence is selected by the terminal from the preamble sequences in a plurality of formats; and the sending module is further configured to send a random access response message to the terminal by using a second BBU, where a frequency band corresponding to the second BBU is the same as the frequency band to which the carrier used by the terminal for uplink transmission belongs.

According to a ninth aspect, an embodiment of this application provides an uplink control system, including: the apparatus according to any possible design of the fifth aspect and the apparatus according to any possible design of the seventh aspect.

According to a tenth aspect, an embodiment of this application provides an uplink control system, including: the apparatus according to any possible design of the sixth aspect and the apparatus according to any possible design of the eighth aspect.

According to an eleventh aspect, an embodiment of this application provides a computer-readable storage medium. The computer-readable storage medium includes an instruction, and when the instruction is run on a computer, the computer is enabled to perform the method according to the first aspect or the second aspect.

According to a twelfth aspect, an embodiment of this application provides a computer-readable storage medium. The computer-readable storage medium includes an instruction, and when the instruction is run on a computer, the computer is enabled to perform the method according to the third aspect or the fourth aspect.

According to a thirteenth aspect, an embodiment of this application provides an uplink control apparatus, including a processor, a memory, and a communications bus, where the communications bus is configured to implement a connection between components, the memory is configured to store a program instruction, and the processor is configured to: read the program instruction in the memory, and perform, based on the program instruction in the memory, the method according to the first aspect or the second aspect.

According to a fourteenth aspect, an embodiment of this application provides an uplink control apparatus, including a processor, a memory, and a communications bus, where the communications bus is configured to implement a connection between components, the memory is configured to store a program instruction, and the processor is configured to: read the program instruction in the memory, and perform, based on the program instruction in the memory, the method according to any one of the third aspect or the fourth aspect.

In the embodiments of this application, when there is no allocated low frequency resource to a network corresponding to the uplink and downlink decoupling scenario, the uplink transmit power of the terminal is determined, and the initial access cell is selected. In addition, when a low frequency resource is allocated to the network corresponding to the uplink and downlink decoupling scenario, the decoupling terminal is identified.

DETAILED DESCRIPTION OF ILLUSTRATIVE EMBODIMENTS

First, an uplink and downlink decoupling technology is briefly described.

The uplink and downlink decoupling technology means that carriers used for uplink transmission and downlink transmission respectively do not belong to a same frequency band. For example, when a low frequency carrier such as a carrier in a 1.8 GHz frequency band is used for the uplink transmission, and a high frequency carrier such as a carrier in a 3.5 GHz frequency band is used for the downlink transmission, the uplink and downlink decoupling is implemented.

All scenarios in embodiments of this application are uplink and downlink decoupling scenarios. In the uplink and downlink decoupling scenarios, a corresponding terminal may be referred to as a decoupling terminal, for example, a terminal that performs uplink transmission on a low frequency carrier and performs downlink receiving on an air interface resource corresponding to a high frequency carrier. Correspondingly, in a non-decoupling scenario, frequencies of carriers corresponding to uplink transmission and downlink transmission are on a same frequency band, and a corresponding terminal may be referred to as a non-decoupling terminal.

In uplink control in an uplink and downlink decoupling scenario, the embodiments of this application relate to three aspects: obtaining an uplink transmit power of a decoupling terminal, determining a cell that is initially accessed, and identifying the decoupling terminal by a base station in an initial access process.

Figure 1:
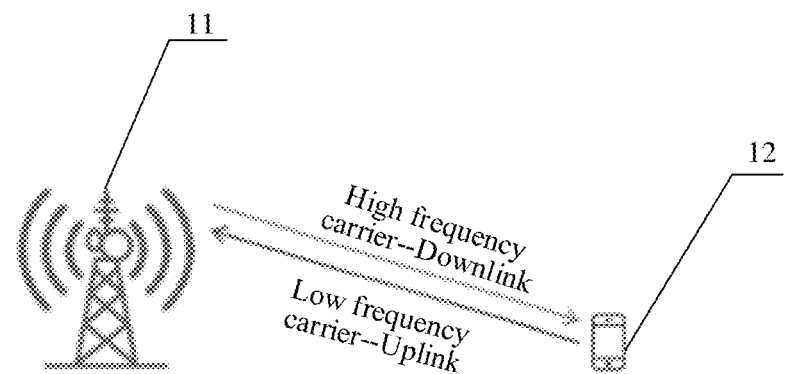
FIG. 1 is a possible application scenario diagram according to an embodiment of this application.

FIG. 1 is a possible application scenario diagram according to an embodiment of this application. Referring to FIG. 1, a system architecture includes a base station 11 and a terminal 12. Both a base station corresponding to downlink transmission (a high frequency carrier) and a base station corresponding to uplink transmission (a low frequency carrier) are deployed in the base station 11.

Figure 2:
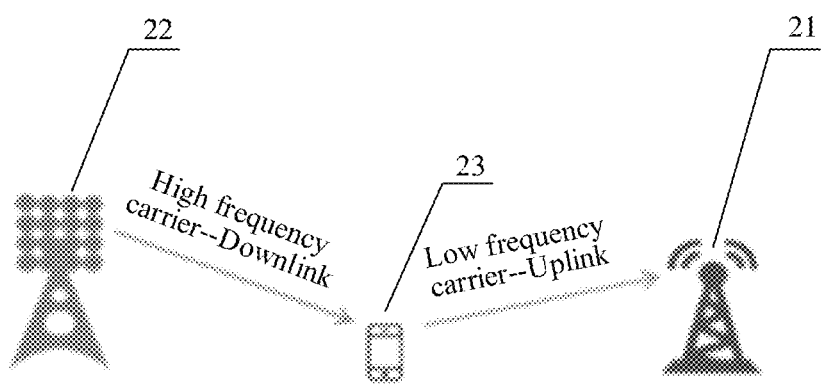
FIG. 2 is another possible application scenario diagram according to an embodiment of this application.

FIG. 2 is another possible application scenario diagram according to an embodiment of this application. Referring to FIG. 2, a system architecture includes a low frequency base station 21, a high frequency base station 22, and a terminal 23. The low frequency base station 21 is a base station corresponding to uplink transmission (a low frequency carrier), and the high frequency base station 22 is a base station corresponding to downlink transmission (a high frequency carrier).

Uplink control methods in the foregoing two application scenarios are described in detail below by using specific embodiments.

An applicable premise of the method for obtaining an uplink transmit power of a terminal and the method for determining a cell initially accessed by a terminal in this application is as follows: A first network (for example, an NR network) corresponding to an uplink and downlink decoupling scenario obtains a low frequency resource by sharing a resource with an existing network, that is, no low frequency resource is allocated to the first network. On the premise of standalone networking of the first network, uplink and downlink transmission may be performed on a high frequency carrier (for example, a carrier in a 3.5 GHz frequency band), and uplink transmission may be performed on a low frequency carrier (for example, a carrier in a 3.5 GHz frequency band). The uplink transmit power of the terminal in this embodiment of this application is an uplink transmit power of the terminal in the first network, and the cell that is initially accessed by the terminal and to be determined is a cell initially accessed by the terminal to the first network.

First, the method for obtaining an uplink transmit power of a terminal is described in detail.

Figure 3:
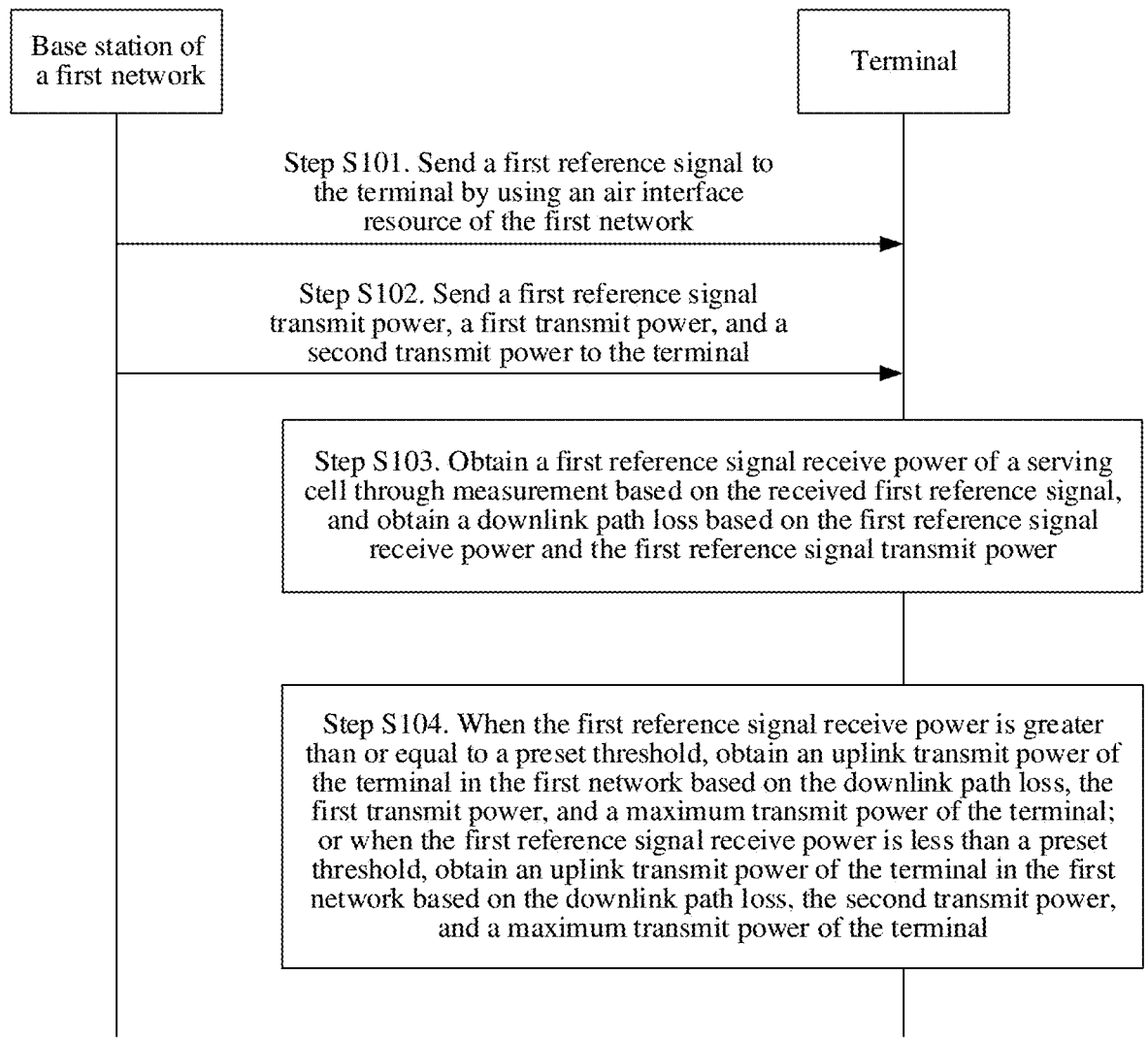
FIG. 3 is a signaling flowchart 1 of a method for obtaining an uplink transmit power of a terminal according to an embodiment of this application.
Figure 4:
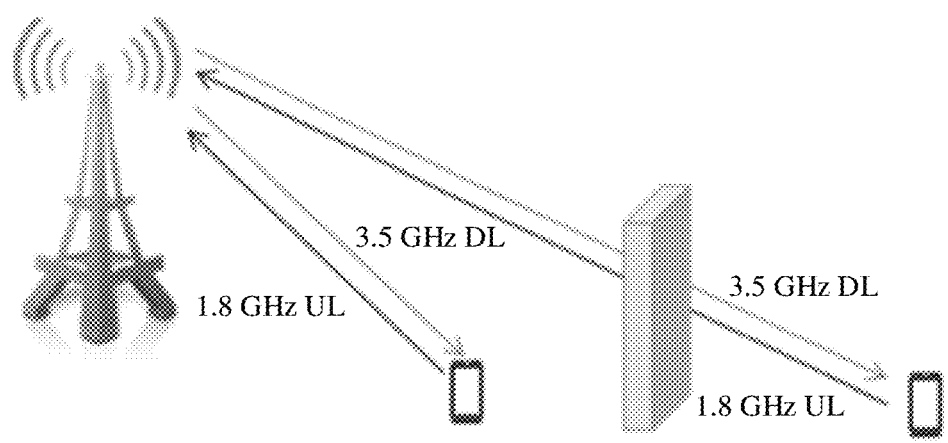
FIG. 4 is a schematic diagram of an actual scenario corresponding to FIG. 3 according to an embodiment of this application.
Figure 5:
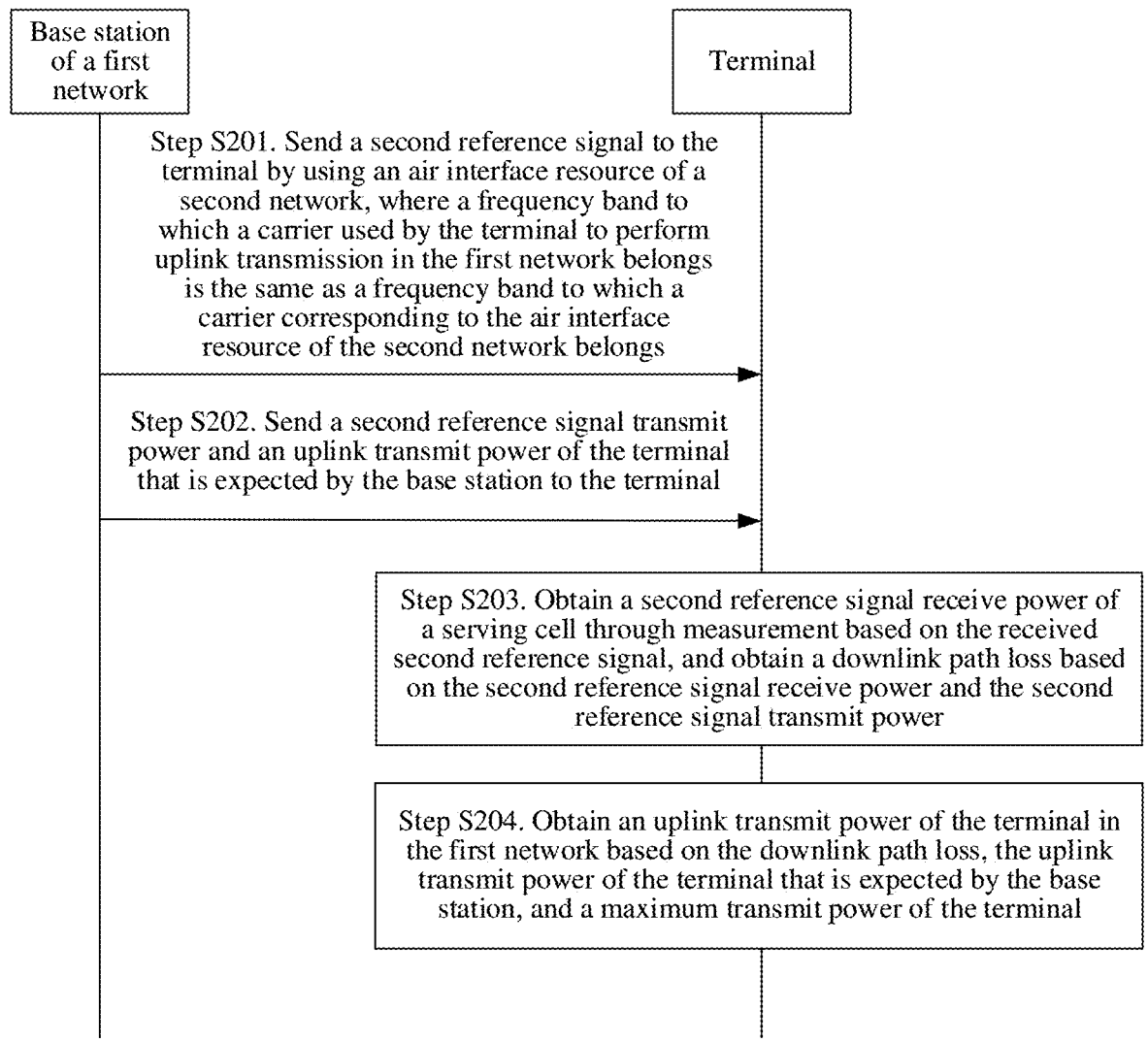
FIG. 5 is a signaling flowchart 2 of a method for obtaining an uplink transmit power of a terminal according to an embodiment of this application.
Figure 6:
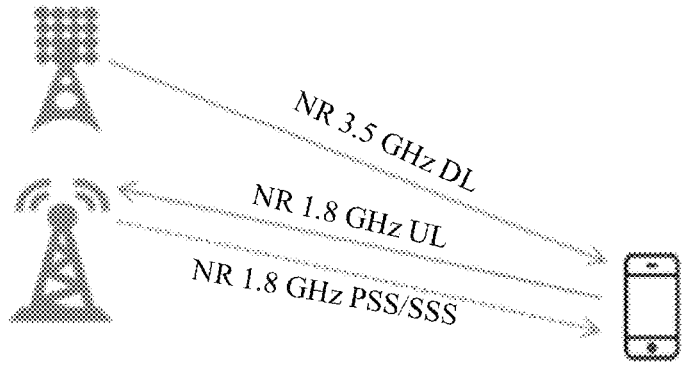
FIG. 6 is a schematic diagram of an actual scenario corresponding to FIG. 5 according to an embodiment of this application.
Figure 7:
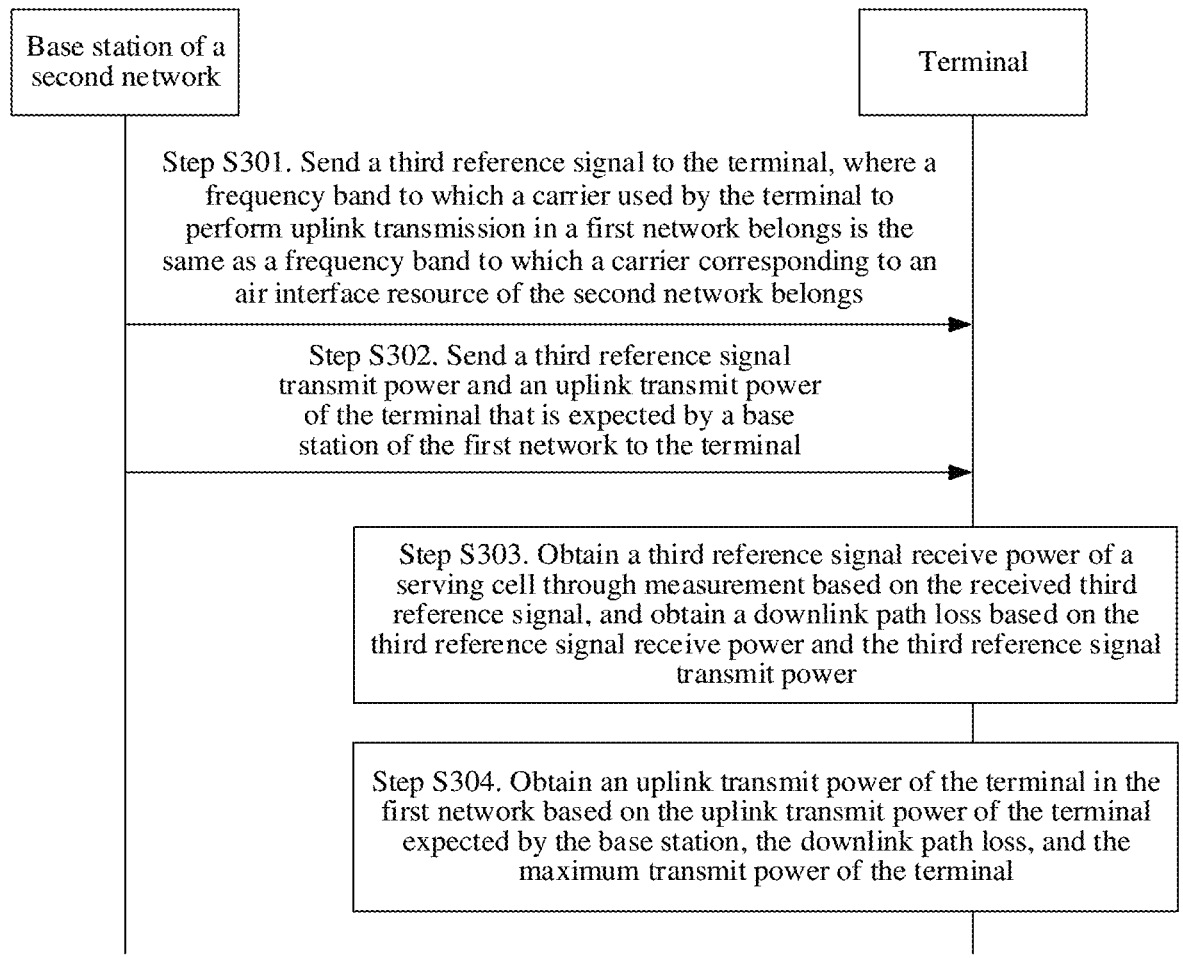
FIG. 7 is a signaling flowchart 3 of a method for obtaining an uplink transmit power of a terminal according to an embodiment of this application.
Figure 8:
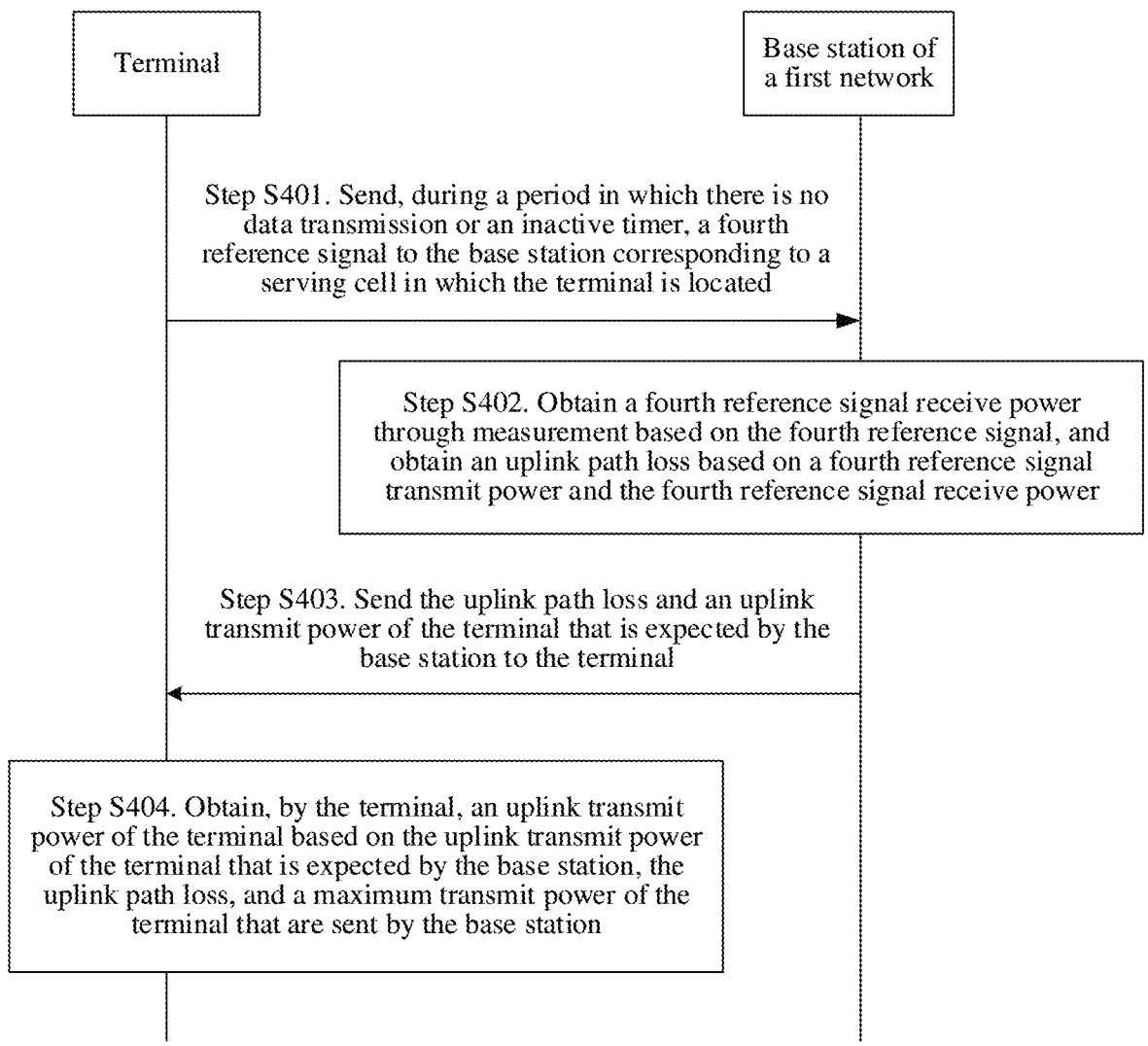
FIG. 8 is a signaling flowchart 4 of a method for obtaining an uplink transmit power of a terminal according to an embodiment of this application.
Figure 9:
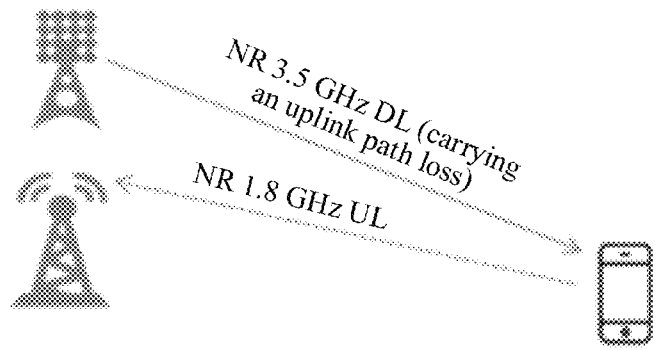
FIG. 9 is a schematic diagram of an actual scenario corresponding to FIG. 8 according to an embodiment of this application.

FIG. 3 is a signaling flowchart 1 of a method for obtaining an uplink transmit power of a terminal according to an embodiment of this application. FIG. 4 is a schematic diagram of an actual scenario corresponding to FIG. 3 according to an embodiment of this application. FIG. 5 is a signaling flowchart 2 of a method for obtaining an uplink transmit power of a terminal according to an embodiment of this application. FIG. 6 is a schematic diagram of an actual scenario corresponding to FIG. 5 according to an embodiment of this application. FIG. 7 is a signaling flowchart 3 of a method for obtaining an uplink transmit power of a terminal according to an embodiment of this application. FIG. 8 is a signaling flowchart 4 of a method for obtaining an uplink transmit power of a terminal according to an embodiment of this application. FIG. 9 is a schematic diagram of an actual scenario corresponding to FIG. 8 according to an embodiment of this application.

The method for obtaining an uplink transmit power of a terminal may be implemented in the following possible implementations.

Referring to FIG. 3, a first possible implementation of obtaining the uplink transmit power of the terminal is as follows.

Step S101. A base station sends a first reference signal to the terminal by using an air interface resource of a first network, where the base station is a base station of the first network.

Step S102. The base station sends a first reference signal transmit power, a first transmit power, and a second transmit power to the terminal, where the first transmit power includes an uplink transmit power of the terminal expected by the base station and a path loss offset, and the second transmit power includes the uplink transmit power of the terminal expected by the base station, the path loss offset, and a penetration loss offset.

Step S103. The terminal obtains a first reference signal receive power of a serving cell through measurement based on the received first reference signal, and obtains a downlink path loss based on the first reference signal receive power and the first reference signal transmit power.

Step S104. When the first reference signal receive power is greater than or equal to a preset threshold, the terminal obtains an uplink transmit power of the terminal based on the downlink path loss, the first transmit power, and a maximum transmit power of the terminal; or when the first reference signal receive power is less than a preset threshold, the terminal obtains an uplink transmit power of the terminal based on the downlink path loss, the second transmit power, and a maximum transmit power of the terminal.

Specifically, the method for obtaining the uplink transmit power of the terminal in this embodiment may be applicable to the application scenario shown in FIG. 1, and is also applicable to an application scenario in which the first network adopts standalone networking and an application scenario in which the first network and a second network adopt non-standalone networking. The first network may be an NR network, and the second network may be an LTE network. In this case, the method for obtaining the uplink transmit power of the terminal in this embodiment is applicable to both an application scenario of NR standalone networking and an application scenario of NR and LTE non-standalone networking, and the base station in this embodiment is an NR base station. The first reference signal in this embodiment may be a cell-specific reference signal C-RS.

The uplink transmit power of the terminal in this embodiment includes a transmit power of a random access preamble and/or a control information transmit power on a physical uplink control channel (PUCCH) and/or a data transmit power on a physical uplink shared channel (PUSCH). In an uplink and downlink decoupling scenario, the uplink transmit power of the terminal in this embodiment is a transmit power used when the terminal performs uplink transmission on a low frequency carrier.

The method in this embodiment is described below by using an example in which the first network is an NR network, the second network is an LTE network, and the first reference signal is a C-RS.

For step S101, when NR adopts standalone networking, the base station sends the C-RS to the terminal on a high frequency carrier (for example, a carrier in a 3.5 GHz frequency band). For an actual scenario, refer to FIG. 4. When NR and LTE adopt non-standalone networking, the base station sends the C-RS to the terminal on a high frequency carrier (for example, a carrier in a 3.5 GHz frequency band).

For step S102, when NR adopts standalone networking, the base station sends a C-RS transmit power, the first transmit power, and the second transmit power to the terminal on a high frequency carrier (for example, a carrier in a 3.5 GHz frequency band). The C-RS transmit power, the first transmit power, and the second transmit power may be carried in a system message. The first transmit power includes the uplink transmit power of the terminal expected by the base station and the path loss offset, and the second transmit power includes the uplink transmit power of the terminal expected by the base station, the path loss offset, and the penetration loss offset. For an actual scenario, refer to FIG. 4. When NR and LTE adopt non-standalone networking, the base station may send the C-RS transmit power, the first transmit power, and the second transmit power to the terminal by using an LTE base station. In this case, the C-RS transmit power, the first transmit power, and the second transmit power may be carried in a radio resource control (RRC) reconfiguration message.

If the uplink transmit power of the terminal is a transmit power of a random access preamble, the uplink transmit power of the terminal expected by the base station is the transmit power that is of the random access preamble of the terminal that is expected by the base station; if the uplink transmit power of the terminal is a control information transmit power on a PUCCH, the uplink transmit power of the terminal expected by the base station is the control information transmit power that the base station expects the terminal to have on the PUCCH; or if the uplink transmit power of the terminal is a data transmit power on a PUSCH, the uplink transmit power of the terminal expected by the base station is the data transmit power that the base station expects the terminal to have on the PUSCH.

The path loss offset and the penetration loss offset by the base station may be obtained by using a method in the prior art. Details are not described in this embodiment again.

For step S103, after receiving the C-RS, the terminal obtains a C-RS receive power of the serving cell through measurement, and obtains the downlink path loss based on the C-RS receive power and the C-RS transmit power, where downlink path loss=C-RS transmit power−C-RS receive power.

A person skilled in the art may understand that, when NR and LTE adopt non-standalone networking, the serving cell is a cell in LTE.

For step S104, when the terminal determines that the C-RS receive power is greater than or equal to the preset threshold, it may be considered that the terminal is located outdoors, and the terminal obtains the uplink transmit power of the terminal based on the downlink path loss, the first transmit power, and the maximum transmit power of the terminal; or when the terminal determines that the C-RS receive power is less than the preset threshold, it may be considered that the terminal is located indoors, and the terminal obtains the uplink transmit power of the terminal based on the downlink path loss, the second transmit power, and the maximum transmit power of the terminal. For an actual scenario, refer to FIG. 4.

Specifically, a process of obtaining the uplink transmit power of the terminal is described by using the transmit power of the random access preamble as an example.

In this case, the base station further sends, to the terminal, a power offset of a preamble currently configured in a preamble format 0. That "the terminal obtains the uplink transmit power of the terminal based on the downlink path loss, the first transmit power, and the maximum transmit power of the terminal" includes: the terminal obtains an initial transmit power of the random access preamble of the terminal based on the downlink path loss, a sum of the first transmit power and the power offset, and the maximum transmit power of the terminal. Alternatively, that "the terminal obtains the uplink transmit power of the terminal based on the downlink path loss, the second transmit power, and the maximum transmit power of the terminal" includes: the terminal obtains an initial transmit power of the random access preamble of the terminal based on the downlink path loss, a sum of the second transmit power and the power offset, and the maximum transmit power of the terminal.

Specifically, the transmit power $P_1$ of the random access preamble, that is, the initial transmit power of the random access preamble, may be obtained by using a formula 1:

$$P_1 = \min(P_{CMAX}, P_{o\text{-}pre} + PL + \Delta_{preamble})$$

Formula 1, where $C_{MAX}$ is the maximum transmit power of the terminal, $P_{o\text{-}pre}$ is the first transmit power or the second transmit power, PL is the downlink path loss, and $\Delta_{preamble}$ is the power offset.

The initial transmit power of the random access preamble is a power of a preamble sequence sent by the terminal to the base station for the first time. If the initial access fails, a subsequent transmit power of the random access preamble of the terminal may be obtained by using a formula 2:

$$P_1 = \min(P_{CMAX}, P_{o\text{-}pre} + PL + \Delta_{preamble} + (N_{pre} - 1) \times \Delta_{step})$$

Formula 2, where $N_{pre}$ is a quantity of times that the terminal sends the preamble sequence, and $\Delta_{step}$ is a power ramp-up step.

In this embodiment, a difference between the uplink path loss and the downlink path loss is considered in use of the path loss offset and the penetration loss offset, so that the uplink transmit power of the terminal is obtained in the uplink and downlink decoupling scenario. In addition, in this embodiment, whether the terminal is located indoors or outdoors is considered, so that the obtained uplink transmit power of the terminal is relatively accurate.

Referring to FIG. 5, a second possible implementation of obtaining the uplink transmit power of the terminal is as follows:

Step S201. A base station sends a second reference signal to the terminal by using an air interface resource of a second network, where a frequency band to which a carrier used by the terminal to perform uplink transmission in a first network belongs is the same as a frequency band to which a carrier corresponding to the air interface resource of the second network belongs, and the base station is a base station of the first network.

Step S202. The base station sends a second reference signal transmit power and an uplink transmit power of the terminal that is expected by the base station to the terminal.

Step S203. The terminal obtains a second reference signal receive power of a serving cell through measurement based on the received second reference signal, and obtains a downlink path loss based on the second reference signal receive power and the second reference signal transmit power.

Step S204. The terminal obtains an uplink transmit power of the terminal in the first network based on the downlink path loss, the uplink transmit power of the terminal expected by the base station, and a maximum transmit power of the terminal.

Specifically, the method for obtaining the uplink transmit power of the terminal in this embodiment may be applicable to the application scenario shown in FIG. 1 or FIG. 2, and is also applicable to an application scenario in which the first network adopts standalone networking and an application scenario in which the first network and the second network adopt non-standalone networking, where uplink-downlink spectrums are shared in the first network and the second network. The first network may be an NR network, and the second network may be an LTE network. In this case, the method for obtaining the uplink transmit power of the terminal in this embodiment is applicable to both an application scenario of NR standalone networking and an application scenario of NR and LTE non-standalone networking, and NR and LTE need to coexist in uplink and downlink. The base station in this embodiment is an NR base station. The second reference signal in this embodiment may be a synchronization reference signal/secondary synchronization reference signal (PSS/SSS).

A meaning of the uplink transmit power of the terminal in this embodiment is the same as that in the foregoing embodiment. Details are not described in this embodiment again.

The method in this embodiment is described below by using an example in which the first network is an NR network, the second network is an LTE network, and the second reference signal is a PSS/SSS.

For step S201, when NR adopts standalone networking or non-standalone networking, the base station sends the PSS/SSS to the terminal by using an LTE air interface resource (for example, a carrier in a 1.8 GHz frequency band or a carrier in a 2.1 GHz frequency band). A time domain resource corresponding to the LTE air interface resource used to send the PSS/SSS may be a multicast/broadcast over single frequency network (Multicast/Broadcast over Single Frequency Network, MBSFN for short) subframe. In this case, the frequency band to which the carrier used by the terminal for uplink transmission in the NR network belongs is the same as a frequency band to which the LTE air interface resource belongs.

For step S202, when NR adopts standalone networking, the base station sends, to the terminal on a high frequency carrier (for example, a carrier in a 3.5 GHz frequency band), a PSS/SSS transmit power and the uplink transmit power of the terminal that is expected by the base station, and the PSS/SSS transmit power and the uplink transmit power of the terminal that is expected by the base station may be carried in a system message. When NR and LTE adopt non-standalone networking, the base station may send the PSS/SSS transmit power and the uplink transmit power of the terminal that is expected by the base station to the terminal by using an LTE base station. The NR base station sends an identifier of a virtual hyper cell to the LTE base station through an LTE core network device. In this case, the PSS/SSS transmit power and the uplink transmit power of the terminal that is expected by the base station may be carried in an RRC reconfiguration message.

For step S203, after receiving the PSS/SSS, the terminal obtains a PSS/SSS receive power of the serving cell through measurement, and obtains the downlink path loss based on the PSS/SSS receive power and the PSS/SSS transmit power, where downlink path loss=PSS/SSS transmit power–PSS/SSS receive power.

A person skilled in the art may understand that, when NR and LTE adopt non-standalone networking, the serving cell is a cell in LTE.

For step S204, the terminal may obtain an uplink path loss based on the downlink path loss, that is, the terminal uses the downlink path loss as the uplink path loss. This is because the PSS/SSS is sent to the terminal by using the LTE air interface resource, and a frequency band to which a carrier used for uplink transmission belongs is the same as a frequency band to which a carrier corresponding to the LTE air interface resource belongs. Therefore, the downlink path loss is directly used as the uplink path loss, and an error is relatively small. In this case, the terminal may obtain the uplink transmit power of the terminal based on the downlink path loss, the uplink transmit power of the terminal expected by the base station, and the maximum transmit power of the terminal.

Specifically, a process of obtaining the uplink transmit power of the terminal is described by still using the transmit power of the random access preamble as an example.

In this case, the base station further sends, to the terminal, a power offset of a preamble currently configured in a preamble format 0. Specifically, the transmit power $P_1$ of the random access preamble, that is, an initial transmit power of the random access preamble, may be obtained by using a formula 3:

$$P_1 = \min(P_{CMAX}, P_{o\text{-}pre} + PL + \Delta_{preamble})$$

Formula 3, where $C_{MAX}$ is the maximum transmit power of the terminal, $P_{o\text{-}pre}$ is the uplink transmit power of the terminal expected by the base station, PL is the downlink path loss, and $\Delta_{preamble}$ is the power offset.

For an actual scenario of the NR standalone networking, refer to FIG. 6.

In this embodiment, the base station sends the reference signal by using the LTE air interface resource, the frequency band of the carrier used by the terminal to perform uplink transmission is the same as the frequency band of the carrier corresponding to the LTE air interface resource, and the downlink path loss may be directly used as the uplink path loss, so that the uplink transmit power of the terminal may be obtained based on the downlink path loss.

Referring to FIG. 7, a third possible implementation of obtaining the uplink transmit power of the terminal is as follows.

Step S301. A base station sends a third reference signal to the terminal, where the base station is a base station of a second network, and a frequency band to which a carrier used by the terminal to perform uplink transmission in a first network belongs is the same as a frequency band to which a carrier corresponding to an air interface resource of the second network belongs.

Step S302. The base station sends a third reference signal transmit power and an uplink transmit power of the terminal that is expected by the base station of the first network to the terminal.

Step S303. The terminal obtains a third reference signal receive power of a serving cell through measurement based on the received third reference signal, and obtains a downlink path loss based on the third reference signal receive power and the third reference signal transmit power.

Step S304. The terminal obtains an uplink transmit power of the terminal in the first network based on the uplink transmit power of the terminal expected by the base station and the downlink path loss, and the maximum transmit power of the terminal.

Specifically, the method for obtaining the uplink transmit power of the terminal in this embodiment may be applicable to an application scenario shown in FIG. 1 or FIG. 2, and is also applicable to the application scenario in which the first network and the second network adopt non-standalone networking. The first network may be an NR network, and the second network may be an LTE network. In this case, the method for obtaining the uplink transmit power of the terminal in this embodiment is applicable to an application scenario of NR and LTE non-standalone networking, and the base station in this embodiment is an LTE base station. When the terminal in this embodiment is a terminal in an idle state, the third reference signal may be a cell-specific reference signal C-RS. When the terminal in this embodiment is a terminal in a connected state, the third reference signal may be a demodulation reference signal (DMRS).

A meaning of the uplink transmit power of the terminal in this embodiment is the same as that in the foregoing embodiment. Details are not described in this embodiment again.

The method in this embodiment is described below by using an example in which the first network is an NR network, the second network is an LTE network, and the third reference signal is a DMRS.

For step S301, the base station sends the DMRS to the terminal. The base station is an LTE base station, that is, the DMRS is an LTE signal. In this case, a frequency band to which a carrier used by the terminal for uplink transmission in the first network belongs is the same as a frequency band to which an LTE air interface resource belongs, for example, a 1.8 GHz frequency band or a 2.1 GHz frequency band.

For step S302, the LTE base station sends a DMRS transmit power and the uplink transmit power of the terminal that is expected by the NR base station to the terminal. In this case, the DMRS transmit power may be carried in a system message sent by the LTE base station, and the uplink transmit power of the terminal that is expected by the NR base station may be carried in an RRC reconfiguration message. The uplink transmit power of the terminal that is expected by the NR base station is sent by the NR base station to the LTE base station by using an LTE core network device, and then is sent by the LTE base station to the terminal.

For step S303, after receiving the DMRS, the terminal obtains a DMRS receive power of the serving cell through measurement, and obtains the downlink path loss based on the DMRS receive power and the DMRS transmit power, where downlink path loss=DMRS transmit power−DMRS receive power.

A person skilled in the art may understand that the serving cell is a cell in LTE.

For step S304, the terminal may obtain an uplink path loss based on the downlink path loss, that is, the terminal uses the downlink path loss as the uplink path loss. This is because the DMRS is an LTE signal, and a frequency band to which a carrier used for uplink transmission belongs is the same as a frequency band to which a carrier corresponding to an air interface resource of the DMRS belongs. Therefore, the downlink path loss is directly used as the uplink path loss, and an error is relatively small. In this case, the terminal may obtain the uplink transmit power of the terminal based on the downlink path loss, the uplink transmit power of the terminal expected by the base station, and the maximum transmit power of the terminal.

Specifically, a process of obtaining the uplink transmit power of the terminal is described by still using the transmit power of the random access preamble as an example.

In this case, the base station further sends, to the terminal, a power offset of a preamble currently configured in a preamble format 0. Specifically, the transmit power $P_1$ of the random access preamble, that is, an initial transmit power of the random access preamble, may be obtained by using a formula 4:

$$P_1 = \min(P_{CMAX}, P_{o\text{-}pre} + PL + \Delta_{preamble})$$

Formula 4, where $P_{CMAX}$ is the maximum transmit power of the terminal, $P_{o\text{-}pre}$ is the uplink transmit power of the terminal expected by the NR base station, PL is the downlink path loss, and $\Delta_{preamble}$ is the power offset.

When the third reference signal is a C-RS, for a specific implementation method, refer to the method in which the third reference signal is the DMRS. Details are not described in this embodiment again.

In this embodiment, when the frequency band to which the carrier used by the terminal for uplink transmission belongs is the same as the frequency band to which the carrier corresponding to the air interface resource of the second network belongs, the downlink path loss of the signal of the second network is directly measured, so that the downlink path loss may be directly used as the uplink path loss, an error is relatively small, and the uplink transmit power of the terminal is obtained.

Referring to FIG. 8, a fourth possible implementation of obtaining the uplink transmit power of the terminal is as follows.

Step S401. The terminal sends, during a period in which there is no data transmission or an inactive timer, a fourth reference signal to a base station corresponding to a serving cell in which the terminal is located, where the base station is a base station of a first network.

Step S402. The base station obtains a fourth reference signal receive power through measurement based on the fourth reference signal, and obtains an uplink path loss based on a fourth reference signal transmit power and the fourth reference signal receive power.

Step S403. The base station sends the uplink path loss and an uplink transmit power of the terminal that is expected by the base station to the terminal.

Step S404. The terminal obtains an uplink transmit power of the terminal based on the uplink transmit power of the terminal expected by the base station, the uplink path loss, and a maximum transmit power of the terminal that are sent by the base station.

Specifically, the method for obtaining the uplink transmit power of the terminal in this embodiment may be applicable to the application scenario shown in FIG. 1 or FIG. 2, and is also applicable to an application scenario in which the first network adopts standalone networking and an application scenario in which the first network and the second network adopt non-standalone networking. The first network may be an NR network, and the second network may be an LTE network. In this case, the method for obtaining the uplink transmit power of the terminal in this embodiment is applicable to both an application scenario of NR standalone networking and an application scenario of NR and LTE non-standalone networking, and the base station in this embodiment is an NR base station. The fourth reference signal may be a sounding reference signal (SRS).

In addition, the terminal in this embodiment is a terminal in a connected state, and is not applicable to obtaining the uplink transmit power of the terminal during initial access.

A meaning of the uplink transmit power of the terminal in this embodiment is the same as that in the foregoing embodiment. Details are not described in this embodiment again.

The method in this embodiment is described below by using an example in which the first network is an NR network, the second network is an LTE network, and the fourth reference signal is an SRS.

For step S401, when NR adopts standalone networking or non-standalone networking, during the period in which there is no data transmission or the inactive timer, the terminal sends the SRS to the NR base station corresponding to the serving cell in which the terminal is located. Because the terminal is a decoupling terminal, the terminal sends, on a low frequency carrier (for example, a carrier on a 1.8 GHz frequency band, that is, a carrier on which the decoupling terminal performs uplink transmission), the SRS to the NR base station corresponding to the serving cell in which the terminal is located. In non-standalone networking, the serving cell is an LTE cell.

For step S402 and step S403, after receiving the SRS, the base station obtains an SRS receive power through measurement, and obtains the uplink path loss based on the SRS receive power and an SRS transmit power, where uplink path loss=SRS transmit power−SRS receive power. In standalone networking, the base station sends the uplink path loss and the uplink transmit power of the terminal that is expected by the base station to the terminal on a high frequency carrier (for example, a carrier on a 3.5 G 3.5 GHz frequency band). The uplink path loss may be carried in a downlink control message, and the uplink transmit power of the terminal expected by the base station is carried in a system message. In non-standalone networking, the base station may send the uplink path loss and the uplink transmit power of the terminal that is expected by the base station to the terminal by using the LTE base station.

For step S404, the terminal obtains the uplink transmit power of the terminal in the first network based on the uplink transmit power of the terminal expected by the base station, the uplink path loss, and the maximum transmit power of the terminal that are sent by the base station.

For a specific implementation process of step S404, refer to the embodiment corresponding to FIG. 7. Details are not described in this embodiment again.

For an actual scenario of the NR standalone networking, refer to FIG. 9.

In this embodiment, the base station measures an uplink path loss of a decoupling low frequency signal, and then sends the uplink path loss to the terminal, so that the uplink transmit power of the terminal in the first network is obtained.

Second, the method for determining an initial access cell of a terminal is described in detail.

Figure 10:
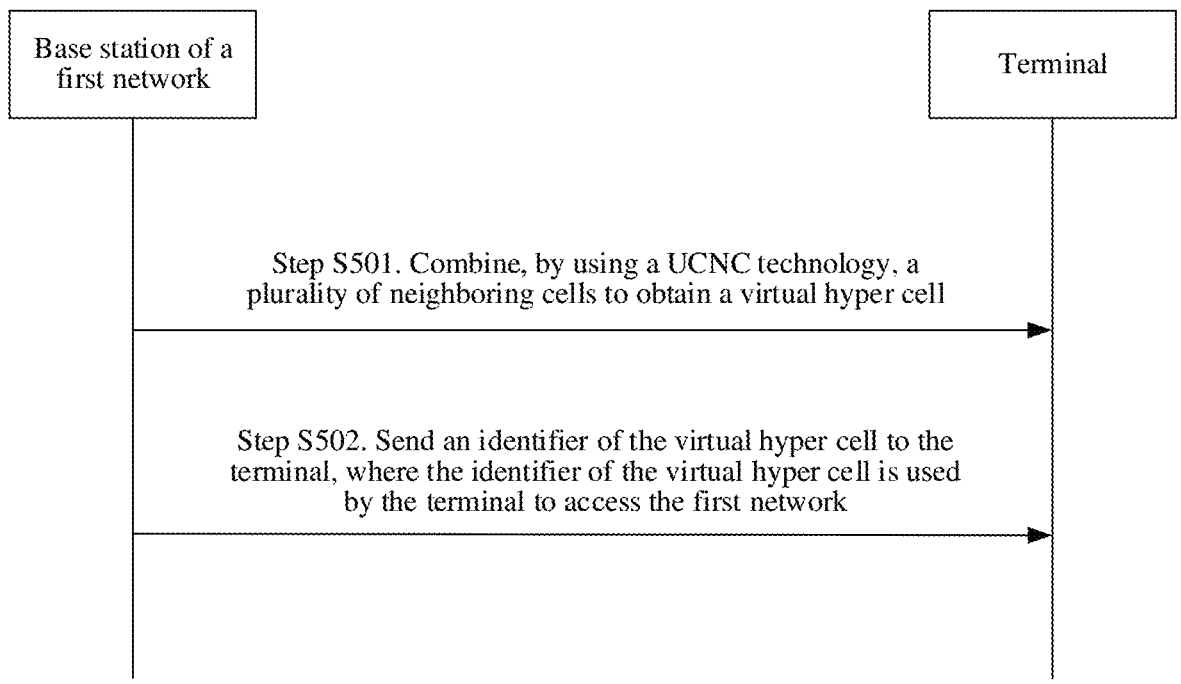
FIG. 10 is a signaling flowchart 1 of a method for determining an initial access cell of a terminal according to an embodiment of this application.
Figure 11:
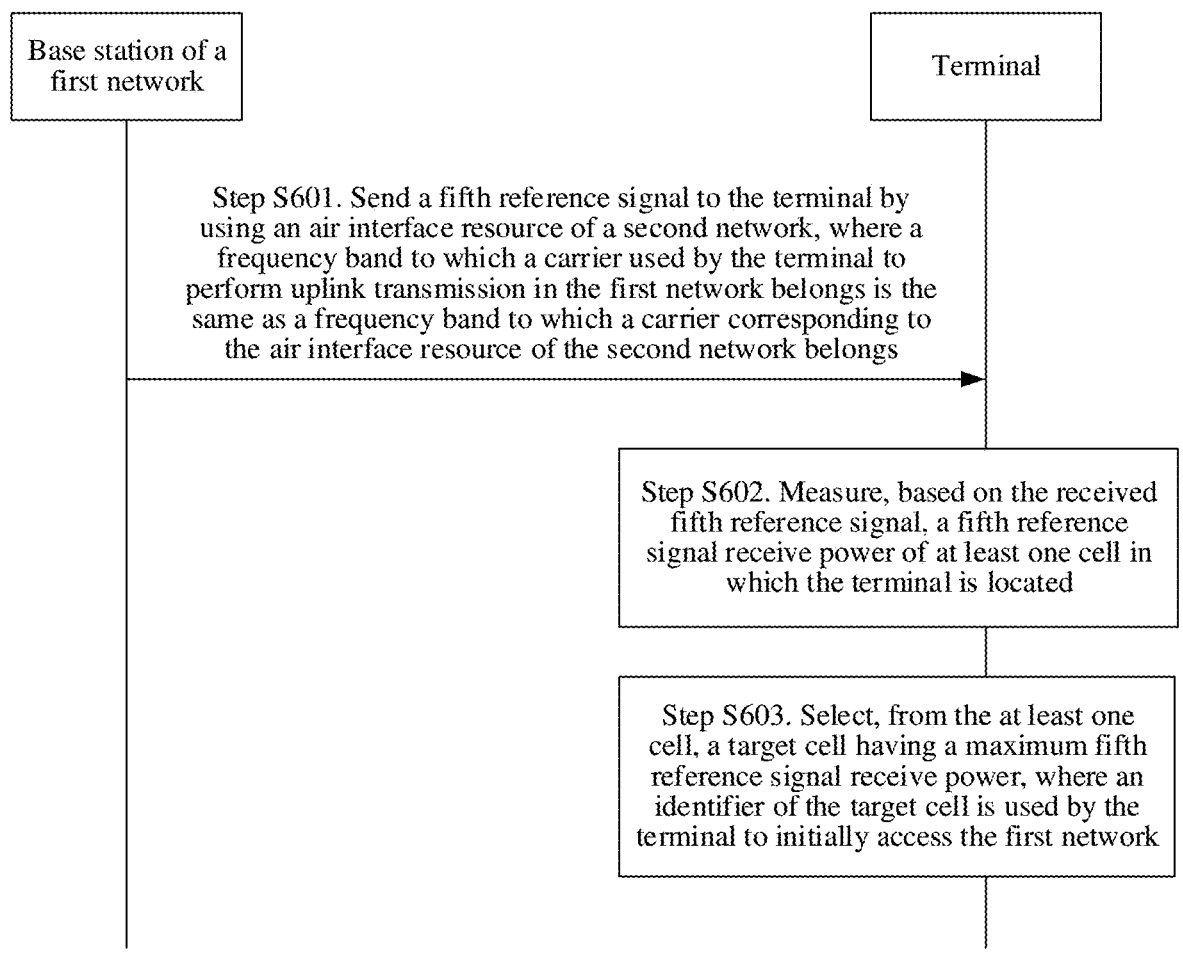
FIG. 11 is a signaling flowchart 2 of a method for determining an initial access cell of a terminal according to an embodiment of this application.
Figure 12:
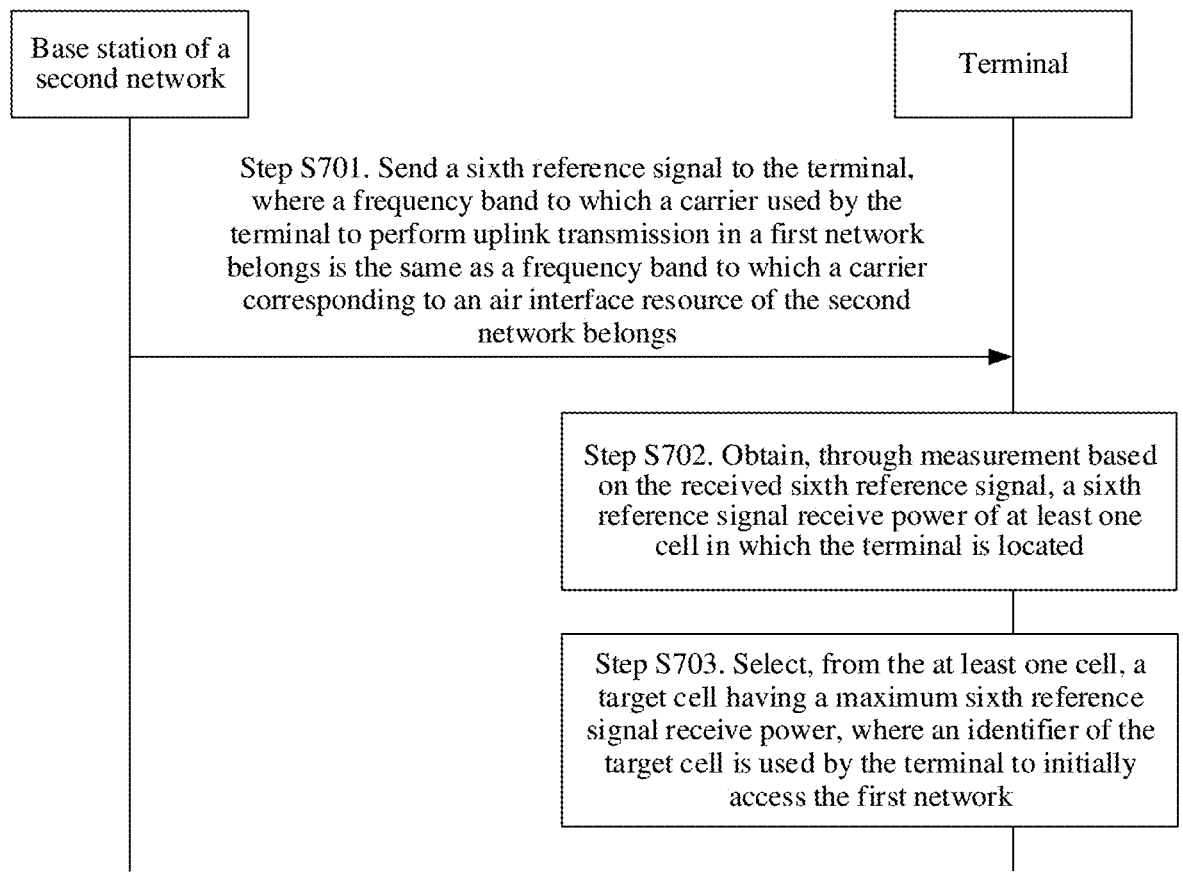
FIG. 12 is a signaling flowchart 3 of a method for determining an initial access cell of a terminal according to an embodiment of this application.

FIG. 10 is a signaling flowchart 1 of a method for determining an initial access cell of a terminal according to an embodiment of this application. FIG. 11 is a signaling flowchart 2 of a method for determining an initial access cell of a terminal according to an embodiment of this application. FIG. 12 is a signaling flowchart 3 of a method for determining an initial access cell of a terminal according to an embodiment of this application.

The method for determining an initial access cell of a terminal may be implemented in the following possible implementations.

Referring to FIG. 10, a first possible implementation is as follows.

Step S501. A base station combines, by using a user centric no cell radio access (UCNC) technology, a plurality of neighboring cells to obtain a virtual hyper cell, where the base station is a base station of a first network.

Step S502. The base station sends an identifier of the virtual hyper cell to the terminal, where the identifier of the virtual hyper cell is used by the terminal to access the first network.

Specifically, the method for obtaining the uplink transmit power of the terminal in this embodiment may be applicable to the application scenario shown in FIG. 1 or FIG. 2, and is also applicable to an application scenario in which the first network adopts standalone networking and an application scenario in which the first network and the second network adopt non-standalone networking. The first network may be an NR network, and the second network may be an LTE network. In this case, the method for determining an uplink transmit power of a terminal in this embodiment is applicable to both an application scenario of NR standalone networking and NR and LTE non-standalone networking, and the base station in this embodiment is an NR base station.

The method in this embodiment is described below by using an example in which the first network is an NR network and the second network is an LTE network.

For step S501, the base station can establish a user-centric network by using the UCNC technology, so that the terminal is unaware of a cell edge. For example, a plurality of neighboring 1.8 GHz uplink cells that belong to NR form a virtual hyper cell, and the terminal considers that there is only one NR 1.8 GHz uplink cell. The plurality of cells that form the virtual hyper cell are preconfigured by an operator.

For step S502, in an NR standalone networking scenario, the NR base station may send the identifier of the virtual hyper cell to the terminal on a high frequency carrier (for example, a carrier in a 3.5 GHz frequency band). In an NR and LTE non-standalone networking scenario, the NR base station may send the identifier of the virtual hyper cell to the terminal by using the LTE base station. To be specific, the NR base station first sends the identifier of the virtual hyper cell to the LTE base station through an LTE core network device.

In this embodiment, the base station establishes the virtual hyper cell by using the UCNC technology, and the terminal side does not need to select a cell for uplink access.

Referring to FIG. 11, a second possible implementation is as follows.

Step S601. A base station sends a fifth reference signal to the terminal by using an air interface resource of a second network, where a frequency band to which a carrier used by the terminal to perform uplink transmission in a first network belongs is the same as a frequency band to which a carrier corresponding to the air interface resource of the second network belongs, and the base station is a base station of the first network.

Step S602. The terminal measures, based on the received fifth reference signal, a fifth reference signal receive power of at least one cell in which the terminal is located.

Step S603. The terminal selects, from the at least one cell, a target cell having a maximum fifth reference signal receive power, where an identifier of the target cell is used by the terminal to initially access the first network.

Specifically, the method for determining an initial access cell of a terminal in this embodiment may be applicable to the application scenario shown in FIG. 1 or FIG. 2, and is also applicable to an application scenario in which the first network adopts standalone networking and an application scenario in which the first network and the second network adopt non-standalone networking. The first network and the second network need to coexist in uplink and downlink. The first network may be an NR network, and the second network may be an LTE network. In this case, the method for obtaining the uplink transmit power of the terminal in this embodiment is applicable to both an application scenario of NR standalone networking and an application scenario of NR and LTE non-standalone networking, and NR and LTE need to coexist in uplink and downlink. The base station in this embodiment is an NR base station. The fifth reference signal may be a PSS/SSS.

The method in this embodiment is described below by using an example in which the first network is an NR network, the second network is an LTE network, and the fifth reference signal is a PSS/SSS.

For step S601, when NR adopts standalone networking or non-standalone networking, the base station sends the PSS/SSS to the terminal by using an LTE air interface resource (for example, a carrier in a 1.8 GHz frequency band or a carrier in a 2.1 GHz frequency band). A time domain resource corresponding to the LTE air interface resource used to send the PSS/SSS may be referred to as an MBSFN subframe for short. In this case, the frequency band to which the carrier used by the terminal for uplink transmission in the NR network belongs is the same as a frequency band to which the LTE air interface resource belongs.

For step S602, after receiving the PSS/SSS, the terminal obtains, through measurement, a PSS/SSS receive power of at least one cell in which the terminal is located.

Specifically, the terminal may be simultaneously located in a plurality of cells corresponding to a plurality of NR base stations. For example, the terminal is located in a cell a corresponding to an NR base station (if in the application scenario in FIG. 2, the NR base station herein is the high frequency base station 22 in FIG. 2) A, and is also located in a cell b corresponding to an NR base station B, so that the terminal needs to measure respective PSS/SSS receive powers of the cell a and the cell b.

A person skilled in the art may understand that a PSS/SSS receive power of the cell a is measured according to a PSS/SSS sent by the NR base station A, and a PSS/SSS receive power of the cell b is measured according to a PSS/SSS sent by the NR base station B.

For step S603, the terminal selects, from the at least one cell, the target cell having the maximum PSS/SSS receive power, where the identifier of the target cell is used by the terminal to initially access the first network.

Specifically, for example, the terminal performs initial access from a cell having a larger PSS/SSS receive power in the cell a and the cell b. For example, if the PSS/SSS receive power of the cell a is greater than the PSS/SSS receive power of the cell b, the cell a is a target cell, and the terminal initially accesses the first network by using the identifier of the target cell.

In this embodiment, when the frequency band to which the carrier corresponding to the air interface resource of the second network belongs is the same as the frequency band to which the carrier used by the terminal to perform the uplink transmission in the first network belongs, the reference signal of the first network is sent to the terminal by using the air interface resource of the second network, the cell in which the first network is initially accessed may be selected by comparing the cell having the maximum reference signal receive power of the at least one cell in which the terminal is located.

Referring to FIG. 12, a third possible implementation is as follows.

Step S701. A base station sends a sixth reference signal to the terminal, where the base station is a base station of a second network, and a frequency band to which a carrier used by the terminal to perform uplink transmission in a first network belongs is the same as a frequency band to which a carrier corresponding to an air interface resource of the second network belongs.

Step S702. The terminal obtains, through measurement based on the received sixth reference signal, a sixth reference signal receive power of at least one cell in which the terminal is located.

Step S703. The terminal selects, from the at least one cell, a target cell having a maximum sixth reference signal receive power, where an identifier of the target cell is used by the terminal to initially access the first network.

Specifically, the method for obtaining the uplink transmit power of the terminal in this embodiment may be applicable to the application scenario shown in FIG. 1 or FIG. 2, and is also applicable to an application scenario in which the first network and the second network adopt non-standalone networking. The first network may be an NR network, and the second network may be an LTE network. In this case, the method for obtaining the uplink transmit power of the terminal in this embodiment is applicable to an application scenario of NR and LTE non-standalone networking, and the base station in this embodiment is an LTE base station. If the terminal in this embodiment is a terminal in a connected state, the sixth reference signal may be a DMRS; or if the terminal in this embodiment is a terminal in an idle state, the sixth reference signal may be a C-RS.

In a non-standalone scenario, the terminal establishes bearers to both the LTE and NR sides (that is, dual connectivity (DC)).

The method in this embodiment is described below by using an example in which the first network is an NR network, the second network is an LTE network, and the sixth reference signal may be a DMRS.

For step S701, the base station sends the DMRS to the terminal. The base station is an LTE base station, that is, the DMRS is an LTE signal. In this case, the frequency band to which the carrier used by the terminal for uplink transmission in the first network belongs is the same as a frequency band to which an LTE network carrier belongs, for example, a 1.8 GHz frequency band.

For step S702, the terminal obtains, through measurement, a DMRS receive power of the at least one cell in which the terminal is located.

Specifically, the terminal may be simultaneously located in a plurality of cells corresponding to a plurality of LTE base stations. For example, the terminal is located in a cell a corresponding to an LTE base station A, and is also located in a cell b corresponding to an LTE base station B, so that the terminal needs to measure respective DMRS receive powers of the cell a and the cell b.

A person skilled in the art may understand that a DMRS receive power of the cell a is measured according to the DMRS sent by the LTE base station A, and a DMRS receive power of the cell b is measured according to the DMRS sent by the LTE base station B. In non-standalone networking, the cell corresponding to the LTE base station has the same coverage as the cell corresponding to the NR base station. The at least one cell is a cell in LTE.

For step S703, the terminal selects, from the at least one cell, the target cell having the maximum DMRS receive power, where the identifier of the target cell is used by the terminal to initially access the first network.

Specifically, for example, the terminal performs initial access from a cell having a larger DMRS receive power in the cell a and the cell b. For example, if the DMRS receive power of the cell a is greater than the DMRS receive power of the cell b, the cell a is a target cell, and the terminal initially accesses the first network by using the identifier of the target cell.

For a method for determining, when the terminal is a terminal in an idle state and the sixth reference signal is a C-RS, a cell in which the terminal initially accesses the first network, refer to a method in which the terminal is a terminal in a connected state and the sixth reference signal is a DMRS. Details are not described herein again.

In this embodiment, by using the reference signal of the second network, a cell having a maximum reference signal receive power in the at least one cell in which the terminal is located may be selected as a cell in which the first network is initially accessed.

In addition, when a low frequency resource is allocated to the first network corresponding to the uplink and downlink decoupling scenario adopts standalone networking, for example, a low frequency resource is allocated to the NR network adopts standalone networking, a cell of the NR network has a low frequency uplink/downlink resource and a high frequency downlink resource. In this case, a decoupling terminal and a non-decoupling terminal coexist. To be specific, the terminal that performs the uplink transmission by using the low frequency carrier may be a decoupling terminal or a non-decoupling terminal, and the base station needs to identify the decoupling terminal.

A method for identifying a decoupling terminal is described in detail below by using specific embodiments when a decoupling terminal is decoupled from a non-decoupling terminal and when a low frequency resource is allocated to a first network corresponding to an uplink and downlink decoupling scenario adopts standalone networking.

Figure 13:
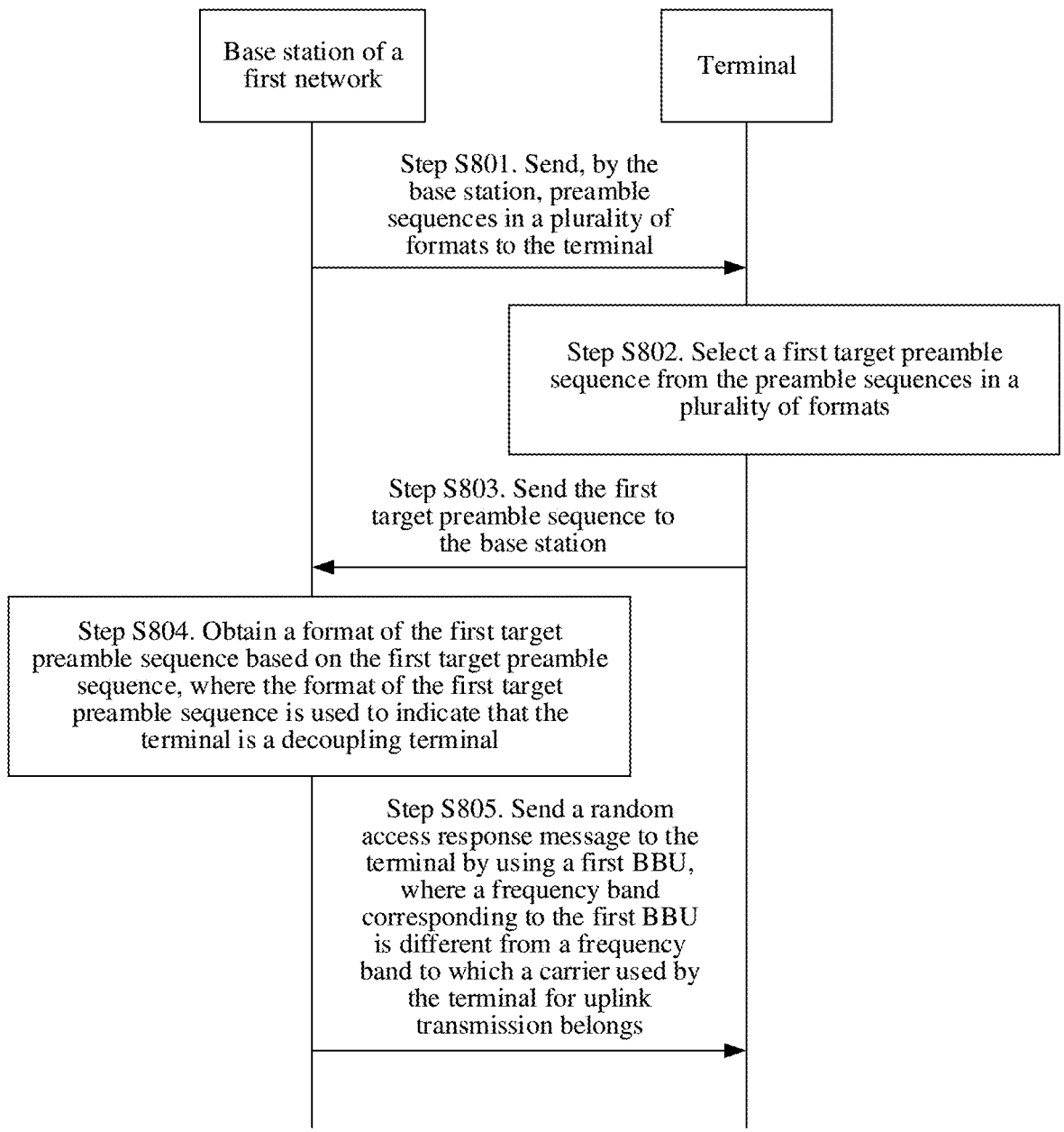
FIG. 13 is a signaling flowchart 1 of a method for identifying a decoupling terminal according to an embodiment of this application.
Figure 14:
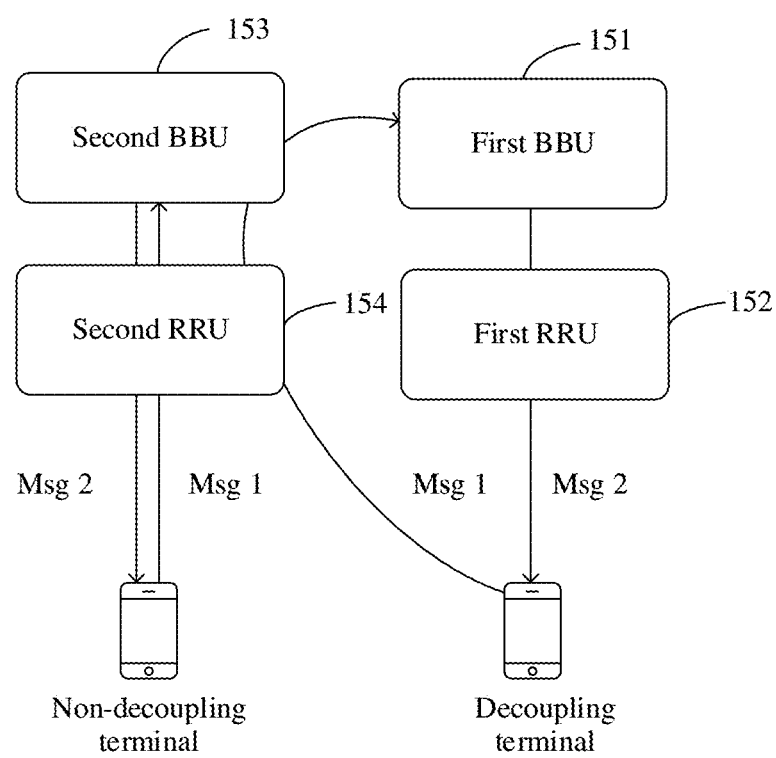
FIG. 14 is a schematic diagram of an actual scenario corresponding to FIG. 13 according to an embodiment of this application.
Figure 15:
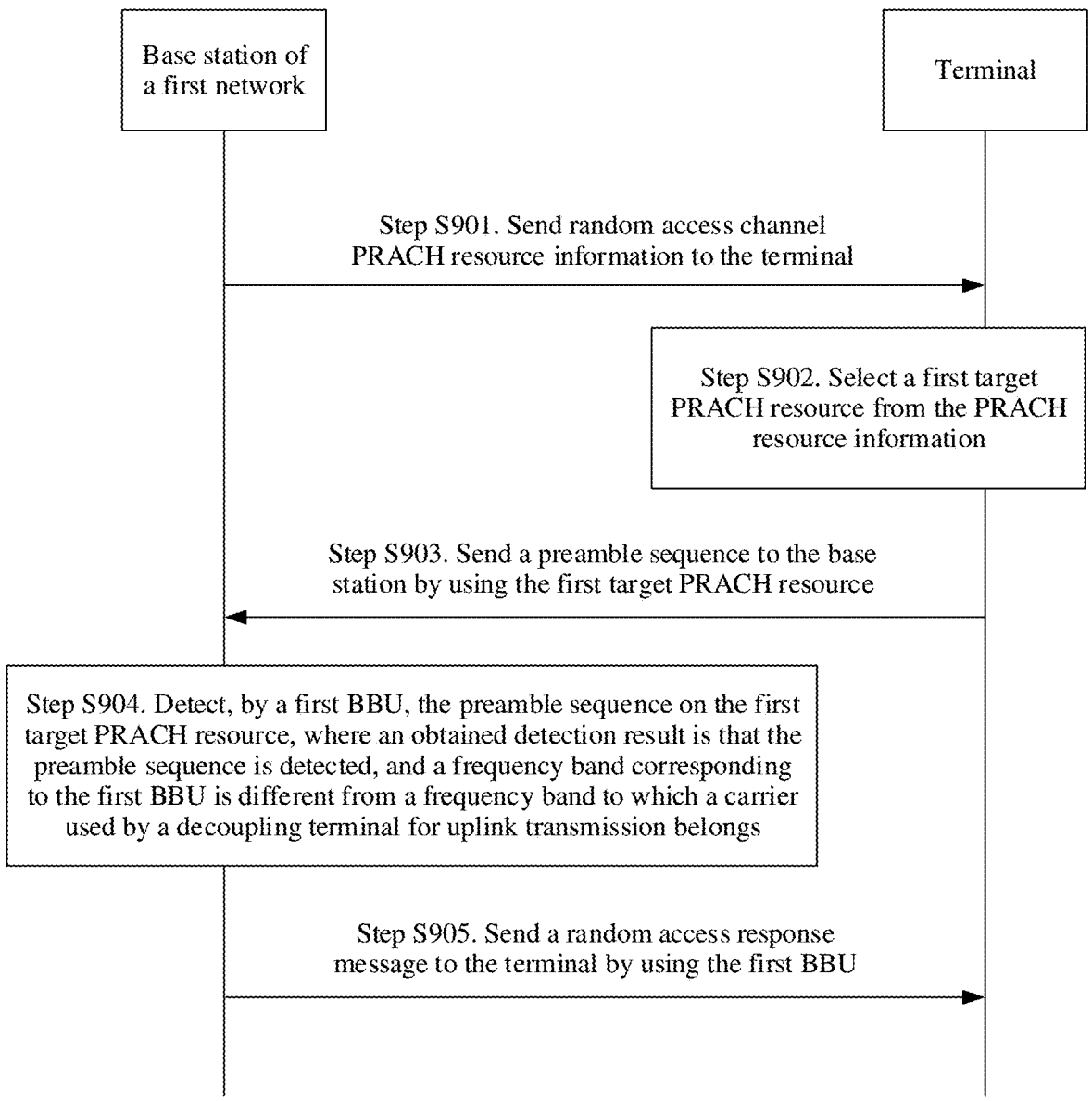
FIG. 15 is a signaling flowchart 2 of a method for identifying a decoupling terminal according to an embodiment of this application.
Figure 16:
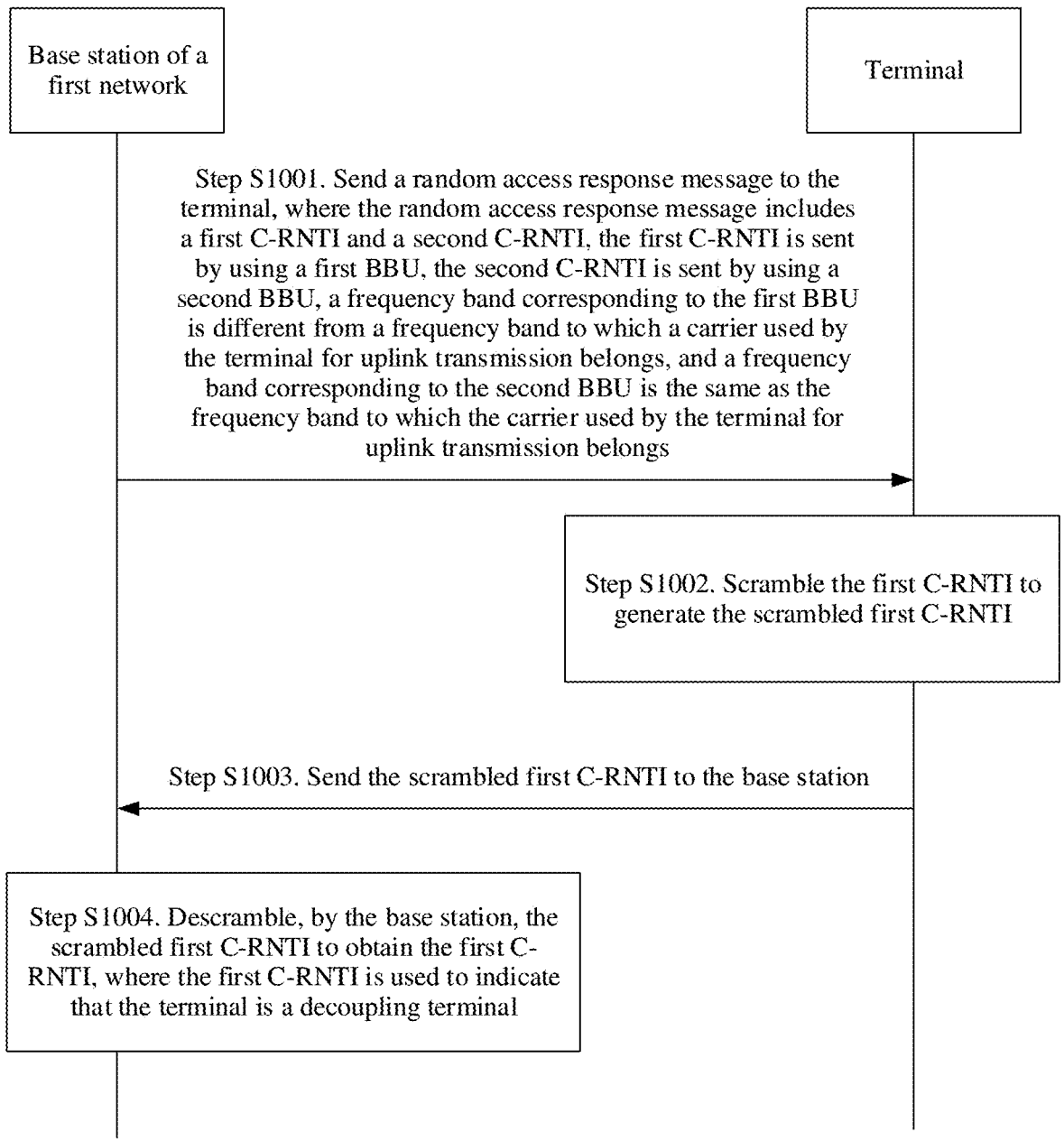
FIG. 16 is a signaling flowchart 3 of a method for identifying a decoupling terminal according to an embodiment of this application.

FIG. 13 is a signaling flowchart 1 of a method for identifying a decoupling terminal according to an embodiment of this application. FIG. 14 is a schematic diagram of an actual scenario corresponding to FIG. 13 according to an embodiment of this application. FIG. 15 is a signaling flowchart 2 of a method for identifying a decoupling terminal according to an embodiment of this application. FIG. 16 is a signaling flowchart 3 of a method for identifying a decoupling terminal according to an embodiment of this application.

The method for identifying a decoupling terminal may be implemented in the following possible implementations.

Referring to FIG. 13, a first possible implementation of the method for identifying a decoupling terminal is as follows.

Step S801. A base station sends preamble sequences in a plurality of formats to a terminal.

Step S802. The decoupling terminal selects a first target preamble sequence from the preamble sequences in a plurality of formats.

Step S803. The decoupling terminal sends the first target preamble sequence to the base station.

Step S804. The base station obtains a format of the first target preamble sequence based on the first target preamble sequence, where the format of the first target preamble sequence is used to indicate that the terminal is a decoupling terminal.

Step S805. The base station sends a random access response message to the decoupling terminal by using a first baseband processing unit BBU, where a frequency band corresponding to the first BBU is different from a frequency band to which a carrier used by the terminal for uplink transmission belongs.

Specifically, this embodiment is applicable to the scenario shown in FIG. 1. The first network may be an NR network. In this case, a low frequency resource is allocated to the NR network, for example, a frequency domain resource of a 1.8 GHz frequency band or a 2.1 GHz frequency band, and the terminal may perform uplink transmission by using a carrier in the 1.8 GHz frequency band. In addition, there is a non-decoupling terminal that can perform uplink transmission by using a carrier in the 1.8 GHz frequency band (and a corresponding carrier used for downlink transmission is also the 1.8 GHz frequency band). The base station needs to identify the decoupling terminal, to perform downlink transmission on a high frequency carrier. Because the first network adopts standalone networking, the base station is a base station of the first network.

The method in this embodiment is described below by using an example in which the allocated low frequency resource in the NR network is a 1.8 GHz frequency band.

Referring to a schematic diagram of an actual scenario in FIG. 14, the base station includes a first baseband processing unit BBU 151, a second BBU 153, a first remote radio unit RRU 152, and a second RRU 154. The first BBU 151 and the first RRU correspond to a high frequency carrier, for example, a carrier in a 3.5 GHz frequency band, and the second BBU 153 and the second RRU correspond to a low frequency carrier, for example, a carrier in a 1.8 GHz frequency band.

For step S1001, the base station sends preamble sequences in a plurality of formats to the terminal on a low frequency carrier (for example, a carrier in a 1.8 GHz frequency band). In this case, both the decoupling terminal and the non-decoupling terminal receive the preamble sequences in a plurality of formats. For example, the preamble sequences in a plurality of formats include a preamble sequence in a format A and a preamble sequence in a format B, a preamble sequence in a format C, and a preamble sequence in a format D. The preamble sequence in format A and the preamble sequence in format B are used for initial access of the decoupling terminal. The preamble sequence in the C format and the preamble sequence in the D format are used for initial access of the non-decoupling terminal.

For step S1002, the decoupling terminal selects a first target preamble sequence (certainly, the target preamble sequence may also be selected from the preamble sequence in the format B) from the preamble sequence in the format A as the preamble sequence used during initial access. Similarly, the non-decoupling terminal selects a second target preamble sequence from the preamble sequence in the C format as the preamble sequence used during initial access.

For step S1003, both the decoupling terminal and the non-decoupling terminal send, to the terminal on a low frequency carrier (for example, a carrier in a 1.8 GHz frequency band), the target preamble sequences selected by the decoupling terminal and the non-decoupling terminal. In other words, the terminal sends a Msg 1 to the base station.

For step S1004, the base station receives the first target preamble sequence, and learns, through analysis, that the format of the first target preamble sequence is the format A, where the format A is used to indicate that the terminal is a decoupling terminal. Similarly, the base station receives the second target preamble sequence, and learns, through analysis, that the format of the second target preamble sequence is a C format, where the C format is used to indicate that the terminal is a non-decoupling terminal.

For step S1005, the base station sends a random access response message (that is, a Msg 2) to the decoupling terminal on a high frequency carrier, where the high frequency carrier may be a carrier in a 3.5 GHz frequency band. That is, the base station sends the random access response message to the terminal by using the first BBU and the first RRU. In other words, the base station modulates the random access response message on the high frequency carrier, and then sends the random access response message to the decoupling terminal. Similarly, the base station sends the random access response message (that is, the Msg 2) to the non-decoupling terminal on a low frequency carrier, and the low frequency carrier may be a carrier in the 1.8 GHz frequency band. That is, the base station sends the random access response message to the non-decoupling terminal by using the second BBU and the second RRU. In other words, the base station modulates the random access response message on the low frequency carrier, and sends the random access response message to the non-decoupling terminal.

In this embodiment, the decoupling terminal is identified by using the format of the preamble sequence sent by the terminal, to implement identification of the decoupling terminal.

Referring to FIG. 15, a second possible implementation of the method for identifying a decoupling terminal is as follows.

Step S901. A base station sends random access channel PRACH resource information to a terminal.

Step S902. The decoupling terminal selects a first target PRACH resource from the PRACH resource information.

Step S903. The decoupling terminal sends a preamble sequence to the base station by using the first target PRACH resource.

Step S904. A first baseband processing unit BBU of the base station detects the preamble sequence on the first target PRACH resource, where an obtained detection result is that the preamble sequence is detected, and a frequency band corresponding to the first BBU is different from a frequency band to which a carrier used by the decoupling terminal for uplink transmission belongs.

Step S905. The base station sends a random access response message to the decoupling terminal by using the first BBU.

Specifically, this embodiment is applicable to the scenario shown in FIG. 1. The first network may be an NR network. In this case, a low frequency resource is allocated to the NR network, for example, a frequency domain resource in a 1.8 GHz frequency band, and the terminal may perform uplink transmission by using a carrier in the 1.8 GHz frequency band. In addition, there is a non-decoupling terminal that can perform uplink transmission by using a carrier in the 1.8 GHz frequency band (a carrier used for downlink transmission corresponding to the non-decoupling terminal is also the 1.8 GHz frequency band). The base station needs to identify the decoupling terminal, to perform downlink transmission on a high frequency carrier. Because the first network adopts standalone networking, the base station is a base station of the first network.

The method in this embodiment is described below by using an example in which the allocated low frequency resource in the NR network is a 1.8 GHz frequency band.

Composition of the base station in this embodiment is the same as that of the base station in the foregoing embodiment. Details are not described in this embodiment again.

For step S901, the base station sends the PRACH resource information to the terminal by using a carrier in the 1.8 GHz frequency band. In this case, the non-decoupling terminal also receives the PRACH resource information. The PRACH resource information may include first PRACH resource information used for initial access of the decoupling terminal and second PRACH resource information used for initial access of the non-decoupling terminal. Corresponding time domain resources in the first PRACH resource information and the second PRACH resource information both belong to the 1.8 GHz frequency band. Before the base station sends the random access channel PRACH resource information to the terminal, the method further includes: the base station configures the first BBU to detect a preamble sequence on a PRACH resource included in the first PRACH resource information; and configures the second BBU to detect a preamble sequence on a PRACH resource included in the second PRACH resource information.

For step S902, the decoupling terminal selects the first target PRACH resource from the first PRACH resource information. Similarly, the non-decoupling terminal selects the second target PRACH resource from the second PRACH resource information.

For step S903, the decoupling terminal sends the preamble sequence to the base station by using the first target PRACH resource. In other words, the decoupling terminal sends the preamble sequence on the first target PRACH resource. Similarly, the non-decoupling terminal sends the preamble sequence to the base station by using the second target PRACH resource. In other words, the non-decoupling terminal sends the preamble sequence on the second target PRACH resource.

For step S904 and step S905, for the decoupling terminal, the first baseband processing unit BBU of the base station may detect the preamble sequence on the first target PRACH resource, and send the random access response message to the terminal on a high frequency carrier, where the high frequency carrier may be a carrier in a 3.5 GHz frequency band. However, the second BBU of the base station cannot detect the preamble sequence of the decoupling terminal on the PRACH resource allocated to the second BBU of the base station, and the second BBU of the base station can detect the preamble sequence of the non-decoupling terminal only on the PRACH resource allocated to the second BBU of the base station. That is, the base station sends the random access response message to the terminal by using the first BBU and the first RRU. In other words, the base station modulates the random access response message on the high frequency carrier, and then sends the random access response message to the decoupling terminal. That is, after the first BBU of the base station detects the preamble sequence on the target PRACH resource, the base station determines that the terminal is a decoupling terminal.

For the non-decoupling terminal, the second BBU of the base station may detect the preamble sequence on the second target PRACH resource, and send the random access response message to the terminal on a low frequency carrier, where the low frequency carrier may be a carrier in the 1.8 GHz frequency band. However, the first BBU of the base station cannot detect the preamble sequence of the non-decoupling terminal on the PRACH resource allocated to the first BBU of the base station, and the first BBU of the base station can detect the preamble sequence of the decoupling terminal only on the PRACH resource allocated to the first BBU of the base station. That is, the base station sends the random access response message to the non-decoupling terminal by using the second BBU and the second RRU. In other words, the base station modulates the random access response message on the low frequency carrier, and sends the random access response message to the non-decoupling terminal. That is, after the second BBU of the base station detects the preamble sequence on the second target PRACH resource, the base station determines that the terminal is a non-decoupling terminal.

In this embodiment, different PRACH resources are allocated to the terminal, the first BBU corresponding to the high frequency carrier is configured to detect the preamble sequence on the PRACH resource allocated to the decoupling terminal, and the first BBU is configured to detect the preamble sequence on the PRACH resource allocated to the decoupling terminal, to implement the identification of the decoupling terminal.

Referring to FIG. 16, a third possible implementation of the method for identifying a decoupling terminal is as follows.

Step S1001. A base station sends a random access response message to a terminal, where the random access response message includes a first cell radio network temporary identifier C-RNTI and a second C-RNTI, the first C-RNTI is sent by the base station by using a first baseband processing unit, the second C-RNTI is sent by the base station by using a second baseband processing unit, a frequency band corresponding to the first baseband processing unit is different from a frequency band corresponding to a carrier used by the terminal for uplink transmission, and a frequency band corresponding to the second baseband processing unit is the same as the frequency band corresponding to the carrier used by the terminal for the uplink transmission.

Step S1002. The decoupling terminal scrambles the first C-RNTI to generate a scrambled first C-RNTI.

Step S1003. The decoupling terminal sends the scrambled first C-RNTI to the base station.

Step S1004. The base station descrambles the scrambled first C-RNTI to obtain the first C-RNTI, where the first C-RNTI is used to indicate that the terminal is a decoupling terminal.

Specifically, this embodiment is applicable to the scenario shown in FIG. 1. The first network may be an NR network. In this case, a low frequency resource is allocated to the NR network, for example, a frequency domain resource of a 1.8 GHz frequency band, and the terminal may perform uplink transmission by using a carrier in the 1.8 GHz frequency band. In addition, there is a non-decoupling terminal that can perform uplink transmission by using a carrier in the 1.8 GHz frequency band (and a corresponding carrier used for downlink transmission is also the 1.8 GHz frequency band). The base station needs to identify the decoupling terminal, to perform downlink transmission on a high frequency carrier. Because the first network adopts standalone networking, the base station is a base station of the first network.

The method in this embodiment is described below by using an example in which the allocated low frequency resource in the NR network is a 1.8 GHz frequency band.

Composition of the base station in this embodiment is the same as that of the base station in the foregoing embodiment. Details are not described in this embodiment again.

For step S1001, the base station sends the random access response message by using the first BBU and the first RRU, and also sends the random access response message by using the second BBU and the second RRU. Each random access response message includes a cell radio network temporary identifier C-RNTI: the first C-RNTI and the second C-RNTI. The first C-RNTI is sent by the base station by using the first BBU, and the second C-RNTI is sent by the base station by using the second BBU. The frequency band corresponding to the first BBU is different from the frequency band corresponding to the carrier used by the decoupling terminal for the uplink transmission, and the frequency band corresponding to the second BBU is the same as the frequency band corresponding to the carrier used by the decoupling terminal for the uplink transmission.

For step S1002, the decoupling terminal can receive only the first C-RNTI sent by the first BBU, and scramble the first C-RNTI, to generate a scrambled first C-RNTI. Similarly, the non-decoupling terminal can receive only the second C-RNTI sent by the second BBU, and scramble the second C-RNTI, to generate a scrambled second C-RNTI.

For step S1003 and step S1004, the decoupling terminal sends the scrambled first C-RNTI to the base station by using the low frequency carrier, that is, sends a Msg 3 to the terminal. The base station descrambles the scrambled first C-RNTI to obtain the first C-RNTI, and the base station determines, based on the first C-RNTI, that the terminal is a decoupling terminal. However, because the terminal can receive only the first C-RNTI sent by the first BBU, in this case, the Msg 3 received by the base station carries the first C-RNTI that indicates the decoupling terminal.

Similarly, after the non-decoupling terminal sends the scrambled second C-RNTI to the base station by using the low frequency carrier, the base station descrambles the scrambled second C-RNTI to obtain the second C-RNTI. In this case, the Msg 3 received by the base station carries the second C-RNTI that indicates the non-decoupling terminal.

In this embodiment, the decoupling terminal and the non-decoupling terminal are differentiated by using the C-RNTI carried in the Msg 3, to implement the identification of the decoupling terminal.

The uplink control apparatus provided in this application is described below by using a specific embodiment.

Figure 17:
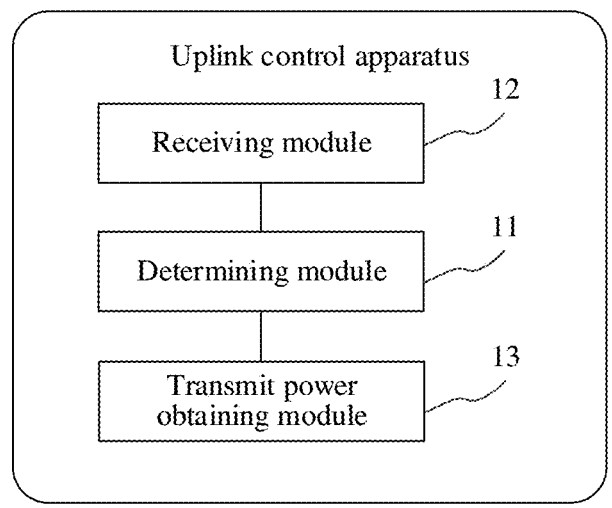
FIG. 17 is a schematic structural diagram 1 of an uplink control apparatus according to an embodiment of this application.

FIG. 17 is a schematic structural diagram 1 of an uplink control apparatus according to an embodiment of this application. Referring to FIG. 17, the apparatus in this embodiment may include a determining module 11, a receiving module 12, and a transmit power obtaining module 13.

The determining module 11 is configured to: measure, based on a received first reference signal, a first reference signal receive power of a serving cell in which the terminal is located, and determine a downlink path loss based on the first reference signal receive power and a received first reference signal transmit power; and the first reference signal is sent by the first target base station of the first network to the terminal by using an air interface resource of the first network. The receiving module 12 is configured to receive a first transmit power and a second transmit power that are sent by a first target base station. The first transmit power includes: an uplink transmit power of the terminal expected by the first target base station and a path loss offset, and the second transmit power includes: the uplink transmit power of the terminal expected by the first target base station, the path loss offset, and a penetration loss offset. The transmit power obtaining module 13 is configured to: if the first reference signal receive power is greater than or equal to a preset threshold, obtain, by the terminal, an uplink transmit power of the terminal in the first network based on the downlink path loss, the first transmit power, and a maximum transmit power of the terminal; or if the first reference signal receive power is less than a preset threshold, obtain, by the terminal, an uplink transmit power of the terminal in the first network based on the downlink path loss, the second transmit power, and a maximum transmit power of the terminal.

If the uplink transmit power of the terminal is an initial transmit power of a random access preamble, the receiving module is specifically configured to receive the first transmit power, the second transmit power, and a power offset of a preamble currently configured in a preamble format 0 that are sent by the first target base station. The transmit power obtaining module is specifically configured to obtain the initial transmit power of the random access preamble of the terminal based on the downlink path loss, a sum of the first transmit power and the power offset, and the maximum transmit power of the terminal; and the transmit power obtaining module is specifically configured to obtain the initial transmit power of the random access preamble of the terminal based on the downlink path loss, a sum of the second transmit power and the power offset, and the maximum transmit power of the terminal.

The apparatus in this embodiment may be configured to perform the technical solutions of the foregoing method embodiments. Implementation principles and technical effects of the apparatus are similar to those of the foregoing method embodiments. Details are not described herein again.

Figure 18:
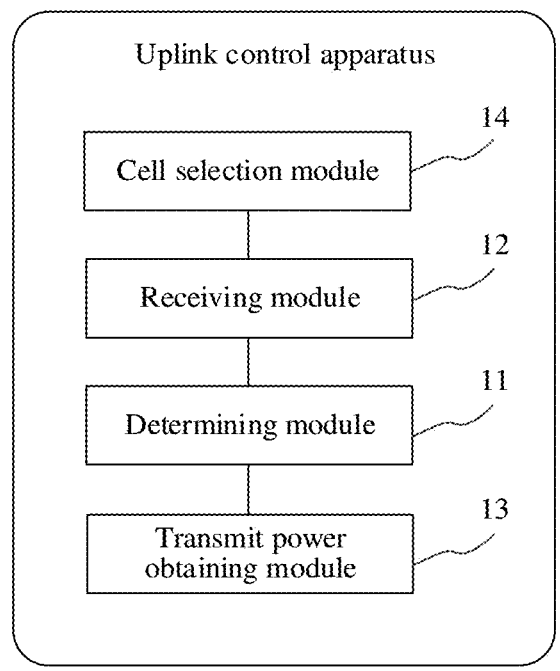
FIG. 18 is a schematic structural diagram 2 of an uplink control apparatus according to an embodiment of this application.

FIG. 18 is a schematic structural diagram 2 of an uplink control apparatus according to an embodiment of this application. As shown in FIG. 18, based on the structure of the apparatus shown in FIG. 17, the apparatus in this embodiment may further include a cell selection module 14.

The cell selection module 14 is configured to: before obtaining the uplink transmit power of the terminal, measure a second reference signal receive power of at least one cell in which the terminal is located, where the second reference signal is sent by the first base station of the first network to the terminal by using an air interface resource of a second network; and a frequency band to which a carrier corresponding to the air interface resource of the second network belongs is the same as a frequency band to which a carrier used by the terminal to perform uplink transmission in the first network belongs; and select, from the at least one cell, a target cell having a maximum second reference signal receive power, where an identifier of the target cell is used by the terminal to initially access the first network.

Alternatively, the cell selection module 14 is configured to: before obtaining the uplink transmit power of the terminal, receive an identifier of a virtual hyper cell sent by a first target base station, where the identifier of the virtual hyper cell is used by the terminal to initially access the first network. The virtual hyper cell is obtained by combining, by the first target base station by using a user centric no cell radio access UCNC technology, a plurality of neighboring cells, and the first target base station is a base station of the first network.

Alternatively, the cell selection module 14 is configured to: before obtaining the uplink transit power of the terminal, obtain, through measurement based on a received third reference signal sent by a second base station of a second network, a third reference signal receive power of at least one cell in which the terminal is located, and select, from the at least one cell, a target cell having a maximum third reference signal receive power. An identifier of the target cell is used by the terminal to initially access the first network, the first network and the second network adopt non-standalone networking; and a frequency band to which a carrier used by the terminal to perform uplink transmission in the first network belongs is the same as a frequency band to which a carrier corresponding to an air interface resource of the second network belongs. The terminal in the connected state and the terminal in the idle state receive different third reference signals. The receiving module 12 is specifically configured to receive a first transmit power and a second transmit power that are sent by the first target base station corresponding to the serving cell by using the second target base station; and the second target base station is a base station of the second network.

The apparatus in this embodiment may be configured to perform the technical solutions of the foregoing method embodiments. Implementation principles and technical effects of the apparatus are similar to those of the foregoing method embodiments. Details are not described herein again.

Figure 19:
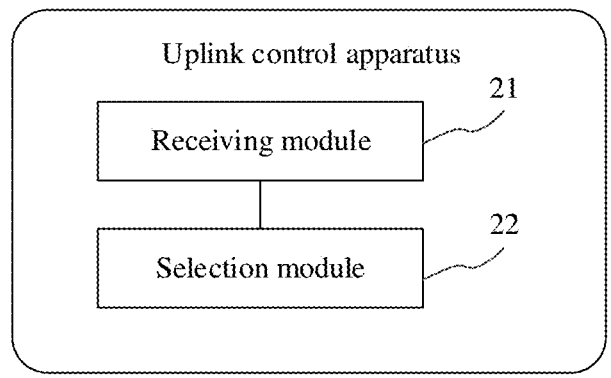
FIG. 19 is a schematic structural diagram 3 of an uplink control apparatus according to an embodiment of this application.

FIG. 19 is a schematic structural diagram 3 of an uplink control apparatus according to an embodiment of this application. Referring to FIG. 19, the apparatus in this embodiment may include a receiving module 21 and a selection module 22.

The receiving module 21 is configured to: when a first network is initially accessed, receive preamble sequences that are in a plurality of formats and that are delivered by a base station. The selection module 22 is configured to: when a terminal is a decoupling terminal, select a first target preamble sequence from the preamble sequences in a plurality of formats, and send the first target preamble sequence to the base station. The format of the first target preamble sequence is used to instruct the base station of the first network to send a random access response message by using a first baseband processing unit BBU, and a frequency band corresponding to the first BBU is different from a frequency band to which a carrier used by the terminal for uplink transmission belongs.

The selection module 22 is further configured to: when the terminal is a non-decoupling terminal, select a second target preamble sequence from a plurality of preamble sequences in a second format, and send the second target preamble sequence to the base station. The format of the second target preamble sequence is used to instruct the base station of the first network to send a random access response message by using a second BBU, and a frequency band corresponding to the second BBU is the same as the frequency band to which the carrier used by the terminal for uplink transmission belongs.

The apparatus in this embodiment may be configured to perform the technical solutions of the foregoing method embodiments. Implementation principles and technical effects of the apparatus are similar to those of the foregoing method embodiments. Details are not described herein again.

Figure 20:
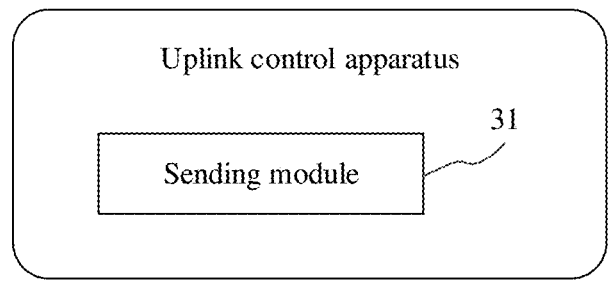
FIG. 20 is a schematic structural diagram 4 of an uplink control apparatus according to an embodiment of this application.

FIG. 20 is a schematic structural diagram 4 of an uplink control apparatus according to an embodiment of this application. Referring to FIG. 20, the apparatus in this embodiment may include a sending module 31.

The sending module 31 is configured to send a first reference signal to a terminal by using an air interface resource of a first network. A base station is a base station of the first network. The first reference signal is used by the terminal to measure a first reference signal receive power of a serving cell in which the terminal is located. The sending module 31 is further configured to send a first reference signal transmit power, a first transmit power, and a second transmit power to the terminal. The first transmit power includes: an uplink transmit power of the terminal expected by the base station and a path loss offset, and the second transmit power includes: the uplink transmit power of the terminal expected by the base station, the path loss offset, and a penetration loss offset. The first reference signal receive power and the first reference signal transmit power are used by the terminal to determine a downlink path loss. When the first reference signal receive power is greater than or equal to a preset threshold, the first transmit power and the downlink path loss are used by the terminal to obtain an uplink transmit power in the first network; or when the first reference signal receive power is less than a preset threshold, the second transmit power and the downlink path loss are used by the terminal to obtain an uplink transmit power in the first network.

The sending module 31 is further configured to send a second reference signal to the terminal by using an air interface resource of a second network. A frequency band to which a carrier used by the terminal to perform uplink transmission in the first network belongs is the same as a frequency band to which a carrier corresponding to the air interface resource of the second network belongs. The second reference signal is used by the terminal to measure a second reference signal receive power of a serving cell in which the terminal is located, and the first reference signal receive power is used by the terminal to determine an initial access cell.

If the uplink transmit power of the terminal is an initial transmit power of a random access preamble, the sending module 31 is specifically configured to send the first reference signal transmit power, the first transmit power, and the second transmit power to the terminal, and send a power offset of a preamble currently configured in a preamble format 0 to the terminal. When the first reference signal receive power is greater than or equal to the preset threshold, the first transmit power, the downlink path loss, and the power offset are used by the terminal to obtain the initial transmit power of the random access preamble in the first network; or when the first reference signal receive power is less than the preset threshold, the second transmit power, the downlink path loss, and the power offset are used by the terminal to obtain the initial transmit power of the random access preamble in the first network.

The apparatus in this embodiment may be configured to perform the technical solutions of the foregoing method embodiments. Implementation principles and technical effects of the apparatus are similar to those of the foregoing method embodiments. Details are not described herein again.

Figure 21:
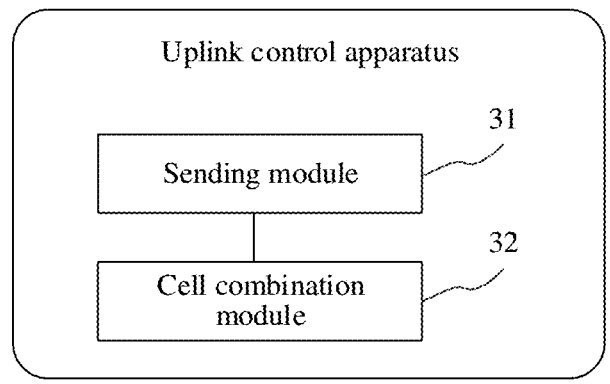
FIG. 21 is a schematic structural diagram 5 of an uplink control apparatus according to an embodiment of this application.

FIG. 21 is a schematic structural diagram 5 of an uplink control apparatus according to an embodiment of this application. As shown in FIG. 21, based on the structure of the apparatus shown in FIG. 20, the apparatus in this embodiment may further include a cell combination module 32.

The cell combination module 32 is configured to combine, by using a user centric no cell radio access UCNC technology, a plurality of neighboring cells to obtain a virtual hyper cell.

The sending module is further configured to send, an identifier of the virtual hyper cell to the terminal, where the identifier of the virtual hyper cell is used by the terminal to access the first network.

The apparatus in this embodiment may be configured to perform the technical solutions of the foregoing method embodiments. Implementation principles and technical effects of the apparatus are similar to those of the foregoing method embodiments. Details are not described herein again.

Figure 22:
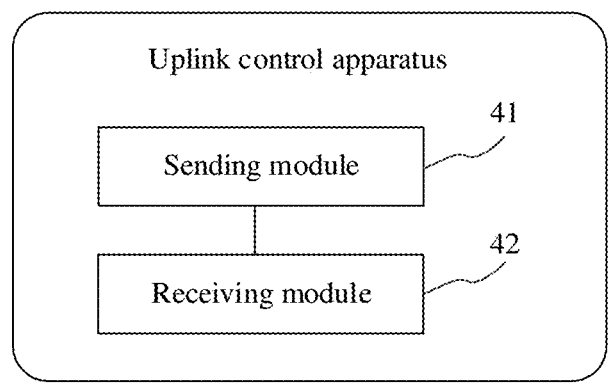
FIG. 22 is a schematic structural diagram 6 of an uplink control apparatus according to an embodiment of this application.

FIG. 22 is a schematic structural diagram 6 of an uplink control apparatus according to an embodiment of this application. As shown in FIG. 22, the apparatus in this embodiment includes a sending module 41 and a receiving module 42.

The sending module 41 is configured to send preamble sequences in a plurality of formats to a terminal. The receiving module 42 is configured to: when the terminal is a decoupling terminal, receive a first target preamble sequence sent by the terminal, and obtain a format of the first target preamble sequence, where the format of the first target preamble sequence is used to indicate that the terminal is a decoupling terminal, and the first target preamble sequence is selected by the terminal from preamble sequences in a plurality of formats.

The sending module 41 is further configured to send, by the base station, a random access response message to the terminal by using a first baseband processing unit BBU, where a frequency band corresponding to the first BBU is different from a frequency band to which a carrier used by the terminal for uplink transmission belongs.

The receiving module is further configured to: if the terminal is a decoupling terminal, receive a second target preamble sequence sent by the terminal, and obtain a format of the second target preamble sequence, where the format of the second target preamble sequence is used to indicate that the terminal is a non-decoupling terminal, and the second target preamble sequence is selected by the terminal from the preamble sequences in a plurality of formats.

The sending module is further configured to send a random access response message to the terminal by using a second BBU, where a frequency band corresponding to the second BBU is the same as the frequency band to which the carrier used by the terminal for uplink transmission belongs.

The apparatus in this embodiment may be configured to perform the technical solutions of the foregoing method embodiments. Implementation principles and technical effects of the apparatus are similar to those of the foregoing method embodiments. Details are not described herein again.

An embodiment of this application further provides an uplink control system, including a terminal and a base station. The terminal may use the structure shown in FIG. 17 or FIG. 18, and the base station may use the structure shown in FIG. 20 or FIG. 21.

An embodiment of this application further provides an uplink control system, including a terminal and a base station. The terminal may use the structure shown in FIG. 19, and the base station may use the structure shown in FIG. 22.

Figure 23:
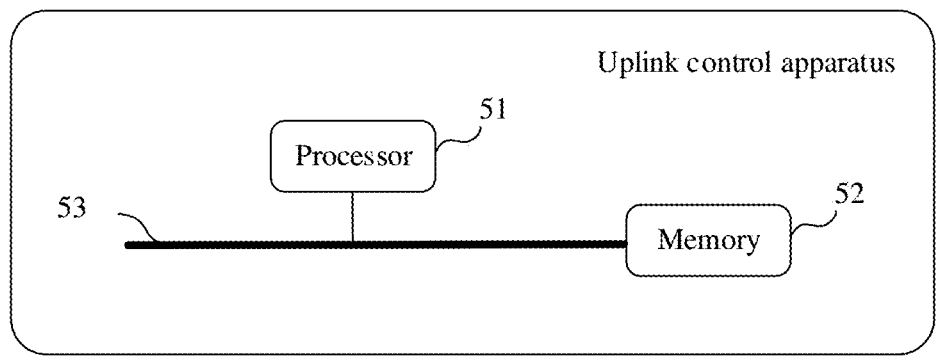
FIG. 23 is a schematic structural diagram 7 of an uplink control system according to an embodiment of this application.

FIG. 23 is a schematic structural diagram 7 of an uplink control system according to an embodiment of this application. Referring to FIG. 23, an embodiment of this application includes a processor 51, a memory 52, and a communications bus 53. The communications bus is configured to implement connection between components, the memory is configured to store a program instruction, and the processor is configured to: read the program instruction in the memory, and perform, based on the program instruction in the memory, the method corresponding to the terminal side in the foregoing method embodiment.

Figure 24:
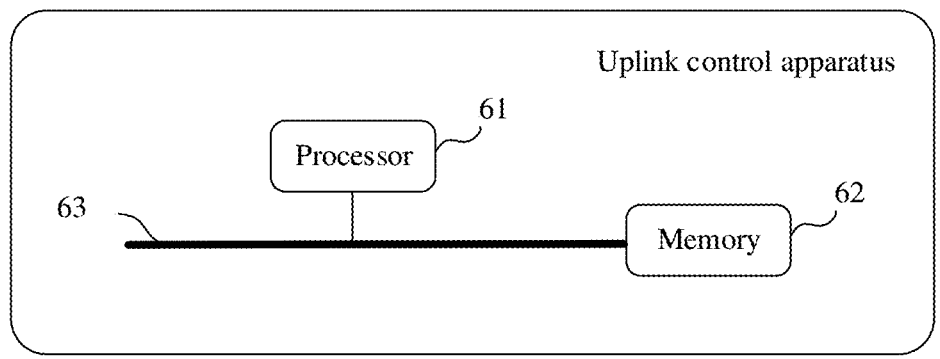
FIG. 24 is a schematic structural diagram 8 of an uplink control system according to an embodiment of this application.

FIG. 24 is a schematic structural diagram 8 of an uplink control system according to an embodiment of this application. Referring to FIG. 24, an embodiment of this application includes a processor 61, a memory 62, and a communications bus 63. The communications bus is configured to implement connection between components, the memory is configured to store a program instruction, and the processor is configured to: read the program instruction in the memory, and perform, based on the program instruction in the memory, the method corresponding to the base station side of the first network in the foregoing method embodiment.

An embodiment of this application further provides a computer readable storage medium. The computer readable storage medium includes an instruction, and when the instruction is run on a computer, the computer is enabled to perform the method performed on a terminal side according to the foregoing method embodiment.

An embodiment of this application further provides a computer-readable storage medium. The computer-readable storage medium includes an instruction, and when the instruction is run on a computer, the computer is enabled to perform the method performed on a base station side of the first network according to the foregoing method embodiment.

Method or algorithm steps described in combination with the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form well-known in the art. For example, a storage medium is coupled with the processor, so that the processor can read information from the storage medium or write information into the storage medium. Certainly, the storage medium may alternatively be a component of the processor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium, or transmitted from one computer-readable storage medium to another computer-readable storage medium. For example, computer instructions may be transmitted from a website, computer, server, or data center by using a cable (for example, a coaxial cable, an optical fiber, or a digital subscriber line (DSL)) or a wireless network. Data is transmitted to another website, computer, server, or data center in infrared, wireless, or microwave mode. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The objectives, technical solutions, and beneficial effects of this application are further described in detail in the foregoing specific implementations. It should be understood that the foregoing descriptions are merely specific implementations of this application, but are not intended to limit the protection scope of this application, any modification, equivalent replacement, improvement, or the like made shall fall within the protection scope of this application.

What is claimed is:

1. An apparatus, comprising:
   a non-transitory computer-readable memory comprising computer-executable instructions; and
   a processor in communication with the non-transitory computer-readable memory, wherein the processor is configured to execute the computer-executable instructions to:
   receive a first reference signal, wherein the first reference signal is sent by a first target base station of a first network to a terminal using an air interface resource of the first network;
   receive a first reference signal transmit power from the first target base station;
   measure, based on the first reference signal, a first reference signal receive power of a serving cell in which the terminal is located;
   determine a downlink path loss based on the first reference signal receive power and the first reference signal transmit power;
   receive a first transmit power and a second transmit power that are sent by the first target base station, wherein the first transmit power comprises an uplink transmit power of the terminal expected by the first target base station and a path loss offset, and the second transmit power comprises the uplink transmit power of the terminal expected by the first target base station, the path loss offset, and a penetration loss offset; and
   obtain an uplink transmit power of the terminal in the first network by:
   in response to the first reference signal receive power being greater than or equal to a preset threshold, obtaining the uplink transmit power of the terminal in the first network based on the downlink path loss, the first transmit power, and a maximum transmit power of the terminal; or
   in response to the first reference signal receive power being less than a preset threshold, obtaining the uplink transmit power of the terminal in the first network based on the downlink path loss, the second transmit power, and the maximum transmit power of the terminal.

2. The apparatus according to claim 1, wherein the processor is further configured to execute the computer-executable instructions to:
   for each cell of at least one cell in which the terminal is located, measure a second reference signal receive power of the respective cell, to obtain one or more second reference signal receive power values, wherein each second reference signal is sent by a first base station of the first network to the terminal using an air interface resource of a second network, and a frequency band to which a carrier corresponding to the air interface resource of the second network belongs is the same as a frequency band to which a carrier used by the terminal to perform uplink transmission in the first network belongs; and
   select, from the at least one cell, a target cell having a maximum second reference signal receive power value from the one or more second reference signal receive power values, wherein an identifier of the target cell is used by the terminal to initially access the first network.

3. The apparatus according to claim 1, wherein the processor is further configured to execute the computer-executable instructions to:
   receive an identifier of a virtual hyper cell sent by the first target base station, wherein the identifier of the virtual hyper cell is used by the terminal to initially access the first network; and
   wherein the virtual hyper cell is obtained by combining, by the first target base station by using a user centric no cell radio access (UCNC) technology, a plurality of neighboring cells.

4. The apparatus according to claim 1, wherein the processor is further configured to execute the computer-executable instructions to:
   receive one or more third reference signals sent by a second base station of a second network, wherein each third reference signal of the one or more third reference signals corresponds to a cell of at least one cell in which the terminal is located;

obtain, through measurement based on the one or more third reference signals, one or more third reference signal receive power values, wherein a third reference signal receive power value is obtained for each cell of the at least one cell in which the terminal is located; and select, from the at least one cell, a target cell having a maximum third reference signal receive power, wherein an identifier of the target cell is used by the terminal to initially access the first network, the first network and the second network are configured to perform non-standalone networking, and a frequency band to which a carrier used by the terminal to perform uplink transmission in the first network belongs is the same as a frequency band to which a carrier corresponding to an air interface resource of the second network belongs;

wherein when the terminal in a connected state the terminal receives different third reference signals than when the terminal is in an idle state; and wherein receiving the first transmit power and the second transmit power comprises:

receiving the first transmit power and the second transmit power that are sent by the first target base station corresponding to the serving cell by using a second target base station.

5. The apparatus according to claim 1, wherein the uplink transmit power of the terminal is an initial transmit power of a random access preamble, and the processor is configured to execute the computer-executable instructions to:

receive the first transmit power, the second transmit power, and a power offset of a preamble currently configured in a preamble format 0 that are sent by the first target base station; and obtain the uplink transmit power of the terminal in the first network by:

obtaining the initial transmit power of the random access preamble of the terminal based on the downlink path loss, a sum of the first transmit power and the power offset, and the maximum transmit power of the terminal; or obtaining the initial transmit power of the random access preamble of the terminal based on the downlink path loss, a sum of the second transmit power and the power offset, and the maximum transmit power of the terminal.

6. An apparatus, comprising:

a non-transitory computer-readable memory comprising computer-executable instructions; and a processor in communication with the non-transitory computer-readable memory, wherein the processor is configured to execute the computer-executable instructions to:

when a first network is initially accessed by a terminal, receive preamble sequences in a plurality of formats that are delivered by a base station of a first network; and when the terminal is configured to communicate in a manner that uplink transmission is decoupled from downlink transmission, select a first target preamble sequence from the preamble sequences in the plurality of formats, and send the first target preamble sequence to the base station using a first format of the plurality of formats, wherein the first format of the first target preamble sequence instructs the base station to send a random access response message using a first baseband processing unit (BBU), and a frequency band corresponding to the first BBU is different from a frequency band to which a carrier used by the terminal for uplink transmission belongs.

7. The apparatus according to claim 6, wherein the processor is configured to execute the computer-executable instructions to:

when the terminal is not configured to communicate in the manner that uplink transmission is decoupled from downlink transmission, select a second target preamble sequence from the preamble sequences in the plurality of formats, and send the second target preamble sequence to the base station using a second format of the plurality of formats, wherein the second format of the second target preamble sequence instructs the base station of the first network to send a random access response message by using a second BBU, and a frequency band corresponding to the second BBU is the same as the frequency band to which the carrier used by the terminal for uplink transmission belongs.

8. An apparatus, comprising:

a non-transitory computer-readable memory comprising computer-executable instructions; and a processor in communication with the non-transitory computer-readable memory, wherein the processor is configured to execute the computer-executable instructions to:

send a first reference signal to a terminal using an air interface resource of a first network, wherein the apparatus is coupled with a base station of the first network, and the first reference signal is usable by the terminal to measure a first reference signal receive power of a serving cell in which the terminal is located; and send a first reference signal transmit power, a first transmit power, and a second transmit power to the terminal, wherein the first transmit power comprises an uplink transmit power of the terminal expected by the base station and a path loss offset, the second transmit power comprises: the uplink transmit power of the terminal expected by the base station, the path loss offset, and a penetration loss offset, and wherein the first reference signal receive power and the first reference signal transmit power are usable by the terminal to determine a downlink path loss;

wherein when the first reference signal receive power is greater than or equal to a preset threshold, the first transmit power and the downlink path loss are used by the terminal to obtain an uplink transmit power in the first network; or when the first reference signal receive power is less than a preset threshold, the second transmit power and the downlink path loss are used by the terminal to obtain the uplink transmit power in the first network.

9. The apparatus according to claim 8, wherein the processor is configured to execute the computer-executable instructions to:

send a second reference signal to the terminal using an air interface resource of a second network, wherein a frequency band to which a carrier used by the terminal to perform uplink transmission in the first network belongs is the same as a frequency band to which a carrier corresponding to the air interface resource of the second network belongs, the second reference signal is usable by the terminal to measure a second reference signal receive power of a serving cell in which the terminal is located, and the first reference signal receive power is usable by the terminal to determine an initial access cell.

10. The apparatus according to claim 8, wherein the processor is configured to execute the computer-executable instructions to:
  combine, using a user centric no cell radio access (UCNC) technology, a plurality of neighboring cells to obtain a virtual hyper cell; and
  send an identifier of the virtual hyper cell to the terminal, wherein the identifier of the virtual hyper cell is usable by the terminal to access the first network.

11. The apparatus according to claim 8, wherein the uplink transmit power of the terminal is an initial transmit power of a random access preamble, and the processor is configured to execute the computer-executable instructions to:
  send the first reference signal transmit power, the first transmit power, and the second transmit power to the terminal, and send a power offset of a preamble currently configured in a preamble format 0 to the terminal; and
  when the first reference signal receive power is greater than or equal to the preset threshold, the first transmit power, the downlink path loss, and the power offset are used by the terminal to obtain the initial transmit power of the random access preamble in the first network; or when the first reference signal receive power is less than the preset threshold, the second transmit power, the downlink path loss, and the power offset are used by the terminal to obtain the initial transmit power of the random access preamble in the first network.

12. An apparatus, comprising:
  a non-transitory computer-readable memory comprising computer-executable instructions; and
  a processor in communication with the non-transitory computer-readable memory, wherein the processor is configured to execute the computer-executable instructions to:
    send preamble sequences in a plurality of formats to a terminal;
    when the terminal is configured to communicate in a manner that uplink transmission is decoupled from downlink transmission, receive a first target preamble sequence sent by the terminal, and obtain a format of the first target preamble sequence, wherein the format of the first target preamble sequence indicates that the terminal is configured to communicate in the manner that uplink transmission is decoupled from downlink transmission, and the first target preamble sequence is selected by the terminal from the preamble sequences in the plurality of formats; and
    send a random access response message to the terminal using a first baseband processing unit (BBU), wherein a frequency band corresponding to the first BBU is different from a frequency band to which a carrier used by the terminal for uplink transmission belongs.

13. The apparatus according to claim 12, wherein the processor is configured to execute the computer-executable instructions to:
  when the terminal is a not configured to communicate in the manner that uplink transmission is decoupled from downlink transmission, receive a second target preamble sequence sent by the terminal, and obtain a format of the second target preamble sequence, wherein the format of the second target preamble sequence indicates that the terminal is not configured to communicate in the manner that uplink transmission is decoupled from downlink transmission, and the second target preamble sequence is selected by the terminal from the preamble sequences in the plurality of formats; and
  send a random access response message to the terminal using a second BBU, wherein a frequency band corresponding to the second BBU is the same as the frequency band to which the carrier used by the terminal for uplink transmission belongs.

* * * * *